US009617453B2

(12) United States Patent
Campbell et al.

(10) Patent No.: US 9,617,453 B2
(45) Date of Patent: Apr. 11, 2017

(54) SOLVENT FREE AQUEOUS POLYURETHANE DISPERSIONS AND METHODS OF MAKING AND USING THE SAME

(75) Inventors: Keith Douglas Campbell, Slatington, PA (US); Shiying Zheng, Center Valley, PA (US); Shafiq Nisarali Fazel, Allentown, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 245 days.

(21) Appl. No.: 12/961,256

(22) Filed: Dec. 6, 2010

(65) Prior Publication Data
US 2011/0306724 A1  Dec. 15, 2011

Related U.S. Application Data

(60) Provisional application No. 61/286,211, filed on Dec. 14, 2009.

(51) Int. Cl.
| C08G 18/08 | (2006.01) |
| C08G 18/10 | (2006.01) |
| C08G 18/12 | (2006.01) |
| C08G 18/28 | (2006.01) |
| C08G 18/42 | (2006.01) |
| C08G 18/44 | (2006.01) |
| C08G 18/48 | (2006.01) |
| C08G 18/66 | (2006.01) |
| C08G 18/73 | (2006.01) |
| C08G 18/75 | (2006.01) |
| C09J 175/04 | (2006.01) |

(52) U.S. Cl.
CPC ........ *C09J 175/04* (2013.01); *C08G 18/0823* (2013.01); *C08G 18/10* (2013.01); *C08G 18/12* (2013.01); *C08G 18/283* (2013.01); *C08G 18/4238* (2013.01); *C08G 18/4277* (2013.01); *C08G 18/44* (2013.01); *C08G 18/4825* (2013.01); *C08G 18/4833* (2013.01); *C08G 18/6625* (2013.01); *C08G 18/6659* (2013.01); *C08G 18/6692* (2013.01); *C08G 18/73* (2013.01); *C08G 18/758* (2013.01)

(58) Field of Classification Search
CPC .... C09J 175/04; C08G 18/0823; C08G 18/10; C08G 18/12; C08G 18/283; C08G 18/4238; C08G 18/4277; C08G 18/44; C08G 18/4825; C08G 18/4833; C08G 18/6625; C08G 18/6659; C08G 18/6692; C08G 18/73; C08G 18/758
USPC .......... 524/589, 590, 591, 839, 840
See application file for complete search history.

(56) References Cited

U.S. PATENT DOCUMENTS

| 2,968,575 A | 1/1961 | Mallonee |
| 3,905,929 A | 9/1975 | Noll |
| 3,920,598 A | 11/1975 | Reiff et al. |
| 4,269,748 A | 5/1981 | Nachtkamp et al. |
| 4,387,181 A | 6/1983 | Brown et al. |
| 4,408,008 A | 10/1983 | Markusch |
| 4,501,852 A | 2/1985 | Markusch et al. |
| 4,528,323 A | 7/1985 | Lorenz et al. |
| 4,745,151 A | 5/1988 | Noll et al. |
| 4,855,077 A | 8/1989 | Shikinami et al. |
| 4,871,798 A | 10/1989 | Dormish et al. |
| 4,914,161 A | 4/1990 | Muller et al. |
| 5,124,400 A | 6/1992 | Tirpak et al. |
| 5,270,433 A | 12/1993 | Klauck et al. |
| 5,354,807 A | 10/1994 | Dochniak |
| 5,432,228 A | 7/1995 | Hilken et al. |
| 5,494,960 A | 2/1996 | Rolando et al. |
| 5,563,208 A | 10/1996 | Konig et al. |
| 5,571,857 A | 11/1996 | Gruber et al. |
| 5,576,382 A | 11/1996 | Seneker et al. |
| 5,616,400 A | 4/1997 | Zhang |
| 5,637,639 A | 6/1997 | Duan et al. |
| 5,703,158 A | 12/1997 | Duan et al. |
| 5,703,193 A | 12/1997 | Rosenberg et al. |
| 5,912,093 A | 6/1999 | Wen et al. |
| 5,965,195 A | 10/1999 | Muller et al. |
| 5,981,650 A | 11/1999 | Zhao et al. |

(Continued)

FOREIGN PATENT DOCUMENTS

| EP | 0 242 731 A2 | 10/1987 |
| EP | 385462 | 9/1990 |
| EP | 0 507 173 A2 | 10/1992 |
| EP | 0 849 298 A1 | 6/1998 |
| EP | 1 717 284 A1 | 11/2006 |
| JP | S604515 A | 1/1985 |
| JP | 1112339 A | 1/1999 |
| JP | 11-228654 | 8/1999 |
| JP | 3361691 B2 | 1/2003 |
| WO | 94/06852 A1 | 3/1994 |
| WO | 03046095 A1 | 6/2003 |
| WO | 2005/068526 A1 | 7/2005 |
| WO | 2006/086715 A2 | 8/2006 |
| WO | 2009/138402 A1 | 11/2009 |
| WO | 2009/144157 A1 | 12/2009 |

OTHER PUBLICATIONS

Szycher, Michael; Szycher's Handbook of Polyurethanes; CRC Press; New York; 1999, pp. 3-27 and 3-28.

(Continued)

*Primary Examiner* — Patrick Niland
(74) *Attorney, Agent, or Firm* — Anne B. Kiernan

(57) ABSTRACT

Substantially solvent-free aqueous polyurethane dispersions and methods of making and using the same are provided. The substantially solvent-free aqueous polyurethane dispersions are provided in a substantially solvent-free system of a prepolymer made by reacting at least one polyol, at least one polyisocyanate, at least one isocyanate-reactive compound comprising one or more ionic or potential ionic groups, and at least one isocyanate chain terminating agent.

45 Claims, 4 Drawing Sheets

(56) References Cited

U.S. PATENT DOCUMENTS

| | | | |
|---|---|---|---|
| 6,077,897 | A | 6/2000 | Wen et al. |
| 6,084,051 | A | 7/2000 | Blum et al. |
| 6,172,126 | B1 | 1/2001 | Muller et al. |
| 6,191,213 | B1 | 2/2001 | Tomko et al. |
| 6,235,384 | B1 | 5/2001 | Voss et al. |
| 6,303,665 | B1 | 10/2001 | Helber et al. |
| 6,312,304 | B1 | 11/2001 | Duthaler et al. |
| 6,312,792 | B1 | 11/2001 | Okada et al. |
| 6,420,478 | B1 | 7/2002 | Irle et al. |
| 6,433,073 | B1 | 8/2002 | Kantner et al. |
| 6,433,996 | B1 | 8/2002 | Hata et al. |
| 6,515,070 | B2 | 2/2003 | Kobylanska et al. |
| 6,576,702 | B2 | 6/2003 | Anderle et al. |
| 6,586,523 | B1 | 7/2003 | Blum et al. |
| 7,242,068 | B2 | 7/2007 | Huang |
| 7,294,670 | B2 | 11/2007 | Kuba et al. |
| 7,342,068 | B2 * | 3/2008 | Klingenberg ...... C08G 18/0823 524/401 |
| 2003/0011867 | A1 | 1/2003 | Loxley |
| 2003/0025855 | A1 | 2/2003 | Holman et al. |
| 2003/0083457 | A1 | 5/2003 | Schafheutle et al. |
| 2003/0125457 | A1 | 7/2003 | Schafheutle et al. |
| 2003/0220463 | A1 | 11/2003 | Bechara et al. |
| 2005/0159575 | A1 | 7/2005 | Rische et al. |
| 2006/0241228 | A1 | 10/2006 | Gertzmann et al. |
| 2009/0286950 | A1 | 11/2009 | Schumann et al. |

OTHER PUBLICATIONS

"TMXDI® (META) Aliphatic Isocyanate, Dispersions for Solvent-Free Adhesives," Cytec Industries, Inc., 2001, pp. 1-13.
"TMXDI® (META) Aliphatic Isocyanate, Dispersions in Inks," Cytec Industries, Inc., 2001, pp. 1-8.
"TMXDI® (META) Aliphatic Isocyanate, The Choice for Aqueous Polyurethane Dispersions," Cytec Industries, Inc., 2001, pp. 1-18.
D. Dieterich, "Aufbau von Netzwerken aus Präpolymeren," Angewandte Makromolekulare Chemie 76/77, 1979, pp. 79-107 (Nr. 1114).
D. Dieterich, "Neuere Waßrige PUR-Systeme," Die Angewandte Makromolekulare Chemie 98 (1981), pp. 133-165 (Nr. 1568).
H. Ulrich, "Urethane Polymers," Kirk-Othmer Encyclopedia of Chemical Technology, 1997, #3, 6 pages.
H. Ulrich, "Urethane Polymers," Kirk-Othmer Encyclopedia of Chemical Technology, 1997, #4, 8 pages.
J. J. Fontanella, "Pressure and Temperature Variation of the Electrical Conductivity of Poly(propylene glycol) containing LiCF3SO3," Journal of Chemical Physics, vol. 111, No. 15, 1999, pp. 7103-7109.
M. A. Ratner, et al., "Ion Transport in Solvent-Free Polymers," Chem. Rev. 1988, 88, pp. 109-124.
M. C. Wintersgill, et al., "Electrical Conductivity, DSC and NMR Studies of PEG and PPG Containing Lithium Salts," Solid State Ionics 135, 2000, pp. 155-161.
N. Ogata, "Ion-Conducting Polymers," Journal of Macromolecular Science, Part C—Polymer Reviews, vol. C42, No. 3, 2002, pp. 399-439.
O. Lorenz, et al., "Einfluß von Lösungsmitteln auf den Partikeldurchmesser von Dispersionen anionischer Polyurethanionomerer," Die Angewandte Makromolekulare Chemie 72, 1978, pp. 115-123 (Nr. 1095).
T. Wen, et al., "Blending Thermoplastic Polyurethanes and Poly-(ethylene oxide) for Composite Electrolytes Via a Mixture Design Approach," National Cheng Kung University, Taiwan, 1999, pp. 680-692.
T. Wen, et al., "Soft Segmental Effect of Methylene Bis(p-cyclohexyl isocyanate) Based Thermoplastic Polyurethane Impregnated with Lithium Perchlorate/Propylene Carbonate on Ionic Conductivity," National Cheng Kung University, Taiwan, 2000, pp. 935-942.
W. D. Davies, "Some Property Aspects of Aqueous Polyurethane Ionmer Dispersions," Spec. Publ.—R. Soc. Chem., 1190, pp. 181-209.
S. Y. Lee, et al., "Preparation and Properties of Water-borne Polyurethanes," Polymer International, 42, pp. 67-76 (1997).
B. K. Kim, "Aqueous Polyurethane Dispersions," Colloid & Polymer Science, vol. 274, pp. 599-611 (1996).
D. Dieterich, "Introduction to Urethane Ionomers," Adv. Urethane Ionomers, Bayer AG, Germany, pp. 1-21 (1995).
C. Yang, et al., "Application and Statistical Experimental Strategies to the Process Optimization of Waterborne Polyurethane," Polymer Engineering and Science, vol. 35, No. 8, pp. 722-730 (1995).
S. D. Seneker, et al., "New Polyether Polyols for Aqueous Polyurethane Dispersions," ARCO Chemical Company, presented at UTECH Asia '97, SunTec City, Singapore (1997).
D. Dieterich, "Aqueous Emulsions, Dispersions and Solutions of Polyurethanes; Synthesis and Properties," Progress in Organic Coatings, vol. 9, pp. 281-340 (1981).
S. Ramesh, et al., "Chain-Extended Polyurethane Anionomers Using Ionic Diols of Varying Methylene Spacers," Journal of Polymer Science: Part A: Polymer Chemistry, vol. 34, pp. 1713-1721 (1996).
F. M. B. Coutinho, et al., "Synthesis and Molecular Weight Determination of Urethane-Baed Anionomers," Polymer Bulletin, vol. 37, pp. 1-5 (1996).
J. Chen, et al., Synthesis of Polyurethane Acrylate Oligomers Based on Polybutadiene Polyol, Journal of Polymer Science: Part A: Polymer Chemistry, vol. 34, pp. 2889-2907 (1996).
T. K. Kim, et al., "Preparations and Properties of Polyurethane Aqueous Dispersion from Uncatalized Systems of H1 2MDI, PTAd/bisphenol A Polyol, and DMPA," Colloid & Polymer Science, vol. 269, pp. 889-894 (1991).
C. K. Kim, et al., "Aqueous Dispersion of Polyurethane Ionomers from Hexamethylene Diisocyanate and Trimellitic Anhydride," Colloid & Polymer Science, vol. 269, pp. 895-900 (1991).

* cited by examiner

US 9,617,453 B2

SOLVENT FREE AQUEOUS POLYURETHANE DISPERSIONS AND METHODS OF MAKING AND USING THE SAME

CROSS-REFERENCE TO RELATED APPLICATIONS

This application claims priority to U.S. Ser. No. 61/286,211 filed Dec. 14, 2009 having the same title, which is incorporated herein by reference in its entirety.

BACKGROUND OF THE INVENTION

This invention relates to the composition, synthesis, and use of one-component substantially solvent-free aqueous polyurethane-urea dispersion.

Polyurethane dispersions have been used in a wide range of commercial applications such as ink, adhesives and coatings for various substrates including textile fabrics, plastic, wood, glass fibers and metals. Chemical resistance, abrasion resistance, toughness, tensile strength, elasticity and durability are among the many desirable properties of these coatings. Polyurethane polymers generally contain urethane groups, and urea groups in their backbone structure. They are typically formed by the reaction of a diisocyanate with a polyol or polyamine.

Conventionally, coatings and adhesive of polyurethane have been formed from solutions of the polyurethane in organic solvents. As the coating and adhesive cure, the solvents evaporate into the atmosphere. This is economically disadvantageous due to the high costs of these solvents, but more importantly, these solvents also cause pollution of the atmosphere and health hazard to people handling the products. Solvent-based polyurethane face ever-tightening health and environmental legislation aimed at reducing volatile organic compound (VOC) and hazardous air pollutant emissions. Accordingly, alternatives to conventional solvent-based products are needed. Some efforts have been directed to polyurethane coatings and adhesive from dispersions of these polymers in water. Economically, the use of water is very advantageous and, in addition, water does not pollute the atmosphere when it evaporates from the coating and adhesive.

Related disclosures include U.S. Pat. No. 2,968,575, U.S. Pat. Nos. 3,905,929, 3,920,598, 4,408,008; 5,270,433; 7,294,670; 4,387,181; 5,563,208; 6,586,523; 5,703,193 and 7,242,068 and U.S. Patent Application Publication Nos. 2006/0241228 A1 and 2003/0220463 A1.

Polyurethane adhesives are being increasingly used in the manufacture of electronic devices. In such devices, the application of the adhesive, specific bonding process and electrical properties of the material are increasingly becoming important to the overall performance and lifetime of the electronic device. The adhesive typically should perform similarly at one condition after being exposed to different conditions. For example, a device such as a display device that shows good contrast ratio and switching times at 25° C. and 80 percent relative humidity should have the same performance when returned to this condition after being exposed to high or low temperatures and humidity for short periods of time. This requirement necessitates that the adhesive electrical properties and adhesion are not altered by exposure to these conditions. Without being bound by theory, it is believed that the electrical properties of the adhesive, specifically volume resistivity and/or conductivity, are related to the materials ability to be ionically conductive.

There are many patents and descriptions of such adhesive materials that are used in electronic devices that demonstrate certain adhesive and electrical properties. However, most of these materials refer to curable systems that are filled with conductive media. Relatively few references to non-curable adhesives are provided.

Thus, to overcome one or more of the deficiencies of the related art, it would be desirable to provide new aqueous polyurethane dispersions and processes of making them.

BRIEF SUMMARY OF THE INVENTION

The invention provides a process for forming a substantially solvent-free or solvent-free aqueous polyurethane dispersion, the process comprising, consisting essentially of, and consisting of the steps of:
(a) reacting
  (i) at least one polyisocyanate;
  (ii) at least one polyol;
  (iii) at least one isocyanate-reactive compound comprising one or more ionic groups or potential ionic groups per molecule; and
  (iv) at least one isocyanate chain terminating agent to form an isocyanate-terminated prepolymer;
(b) neutralizing the isocyanate-reactive compound (iii) with a neutralizing agent;
(c) dispersing the isocyanate-terminated prepolymer in substantially solvent-free or solvent-free water; and
(d) reacting the isocyanate-terminated prepolymer with at least one chain extending agent to form a substantially solvent-free or solvent-free polyurethane dispersion.

This invention further provides a substantially solvent-free or solvent-free aqueous polyurethane dispersion comprising, consisting essentially of, and consisting of a polyurethane polymer comprising the reaction product of:
(a) a substantially solvent-free or solvent-free isocyanate-terminated prepolymer comprising the reaction product of
  (i) at least one polyisocyanate;
  (ii) at least one polyol;
  (iii) at least one isocyanate-reactive compound comprising one or more ionic groups or potential ionic groups per molecule; and
  (iv) at least one isocyanate chain terminating agent;
(b) at least one neutralizing agent that neutralizes the isocyanate-reactive compound (iii);
(c) substantially solvent-free or solvent-free water; and
(d) at least one chain extending agent comprising an organic polyamine.

This invention further provides an aqueous polyurethane dispersion comprising, consisting essentially of and consisting of:
(A) a substantially solvent-free or solvent-free polyurethane polymer comprising the reaction product of:
  (a) an isocyanate-terminated prepolymer comprising the reaction product of:
    (i) at least one diisocyanate comprising at least 50 percent by weight of dicycloheyxylmethane 4,4-diisocyanate (commonly referred to H12MDI);
    (ii) at least one polyol comprising a difunctional polyol comprising poly(propylene glycol) or poly(tetramethylene ether) glycol;
    (iii) at least one isocyanate-reactive compound comprising one or more ionic group or a potential ionic group per molecule, each of said potential ionic groups being capable of forming a salt upon neutralization with a neutralizing agent, and at least two isocyanate-reactive groups per molecule selected from a hydroxyl group, a thio group, a primary amino group, a secondary amino group, and combinations thereof; and (iv) at least one isocyanate chain terminating agent comprising hydrophilic ethylene oxide units and one isocyanate-reactive group per molecule selected from a hydroxyl, thio, and amino group;

(b) a neutralizing agent comprising an amine;

(c) a chain extending agent comprising an organic polyamine; and (e) water; and optionally (B) at least one ionic additive selected from an inorganic salt, an organic salt, and combinations thereof.

This invention further provides a substantially solvent-free or solvent-free isocyanate-terminated prepolymer for use in stable substantially solvent-free or solvent-free aqueous polyurethane dispersion comprising, consisting essentially of or consisting of:

a) at least one polyisocyanate comprising aliphatic or cycloaliphatic bound polyisocyanate, for example dicyclohexylmethane 4,4-diisocyanate (commonly referred to H12MDI), b) at least one polyol including polyether (including co-polyethers), polyester, polycarbonate, polyacetal, polythioethers, polyamide, or polyester amide polyol component, for example poly(propylene glycol), poly(tetramethylene ether) glycol, poly(neopentyl glycol adipate), c) at least one isocyanate-reactive compound comprising one or more ionic groups or potential ionic groups per molecule, such as a carboxylic acid functional group, capable of forming a salt upon neutralization and at least two isocyanate-reactive groups per molecule selected from a hydroxyl, a thio, a primary amino, a secondary amino, and combinations thereof; and d) at least one isocyanate chain terminating agent comprising hydrophilic ethylene oxide units and one isocyanate-reactive group per molecule selected from a hydroxyl, thio, and amino group.

The invention comprises, in another aspect, a process for making a substantially solvent-free or solvent-free prepolymer for use in a stable substantially solvent-free or solvent-free aqueous polyurethane dispersion, wherein the prepolymer comprises:

a) at least one diisocyanate comprising aliphatic or cycloaliphatic bound diisocyanate, for example dicyclohexylmethane 4,4-diisocyanate (H12MDI), b) at least one polyol including polyether (including co-polyethers), polyester, polycarbonate, polyacetal, polythioethers, polyamide, or polyester amide polyol component, for example poly(propylene glycol), poly(tetramethylene ether) glycol, poly(neopentyl glycol adipate).

c) at least one isocyanate-reactive compound comprising a carboxylic acid functional group capable of forming a salt upon neutralization with a neutralizing agent and at least two isocyanate-reactive groups per molecule selected from a hydroxyl group, a thio group, a primary amino group, a secondary amino group, and combinations thereof; and d) at least one isocyanate chain terminating agent comprising hydrophilic ethylene oxide units and one isocyanate-reactive group per molecule selected from a hydroxyl group, thio group, and amino group;

and the process comprises combining a), b), c) and d) in a substantially solvent-free or solvent-free system.

The invention comprises, consists essentially of or consists of, in another aspect, a substantially solvent-free or solvent-free aqueous polyurethane dispersion, comprising a prepolymer which comprises components a), b), c), and d), wherein the aqueous polyurethane dispersion is a substantially solvent-free or solvent-free system that further comprises:

e) at least one neutralizing agent to form an ionic salt with the component c), f) at least one chain extending agent comprising organic diamines, and g) optionally, at least one chain extending and crosslinking agent comprising organic polyamines having at least two or more or at least three or more primary or secondary amino or mixtures of primary or secondary amino groups per molecule. The organic polyamines serves both as extending agent and crosslinking agent.

The invention provides, in a further aspect, a process for making substantially solvent-free or solvent-free aqueous polyurethane dispersions, wherein the aqueous polyurethane dispersions comprise, consist essentially of, or consists of: one or more of any of the prepolymers described above in this Summary of the Invention wherein the aqueous polyurethane dispersions are a substantially solvent-free or solvent-free system that further comprises:

e) at least one neutralizing agent to form an ionic salt with the isocyanate reactive compound, f) at least one chain extending agent comprising organic diamines, and wherein the process comprises the steps of: adding at least one neutralizing agent to either the prepolymer or aqueous medium prior to dispersing prepolymer in an aqueous medium, dispersing the prepolymer in an aqueous medium, and reacting the isocyanate-terminated prepolymer with at least one chain extending agent.

The invention provides, in a still further aspect, substantially solvent-free or solvent-free aqueous polyurethane dispersions, comprising one or more of any of prepolymers described above in this Summary of the Invention which comprises components a), b), c), and d), wherein the aqueous polyurethane dispersions are a substantially solvent-free or solvent-free system that further comprises:

e) at least one neutralizing agent to form an ionic salt with the component c), f) at least one chain extending agent comprising organic diamines, and g) optionally, at least one chain extending and crosslinking agent comprising organic polyamines containing at least three or more primary and/or secondary amino groups per molecule;

h) at least one ionic additive selected from an inorganic salt, an organic salt, and combinations thereof.

This invention further provides adhesives, e.g. lamination adhesives comprising any of the aqueous polyurethane dispersions described above. This invention also provides ionically conducting polymeric electrolytes comprising any of the aqueous polyurethane dispersions described above. The invention additionally comprises films, coatings, and adhesives comprising or produced from aqueous polyurethane dispersions described above.

Some of the benefits that may be provided by one or more of the embodiments of the polyurethane dispersions of this invention include: narrow particle size distribution in colloidal aqueous dispersions, good freeze-thaw performance, low and high temperature storage performance, stable (meaning the polymers preferably remain dispersed when stored for at least 3 months) substantially solvent-free or solvent-free aqueous polyurethane dispersions, stable in a wide range of pH and temperatures and in the presence of electrolytes. Some of the benefits that may be provided by one or more of the embodiments of the process for making the polyurethane dispersions disclosed herein include: that little or no solvent or non-reactive diluents may be required, and/or no catalyst may be required for the process and manufacturing. It was known to use water to form polyurethane dispersions, however, by using solvents to manufacture the polyurethanes, the resulting dispersions also had solvents therein that either were released to the environment when used.

DETAILED DESCRIPTION OF THE INVENTION

Figure 1:
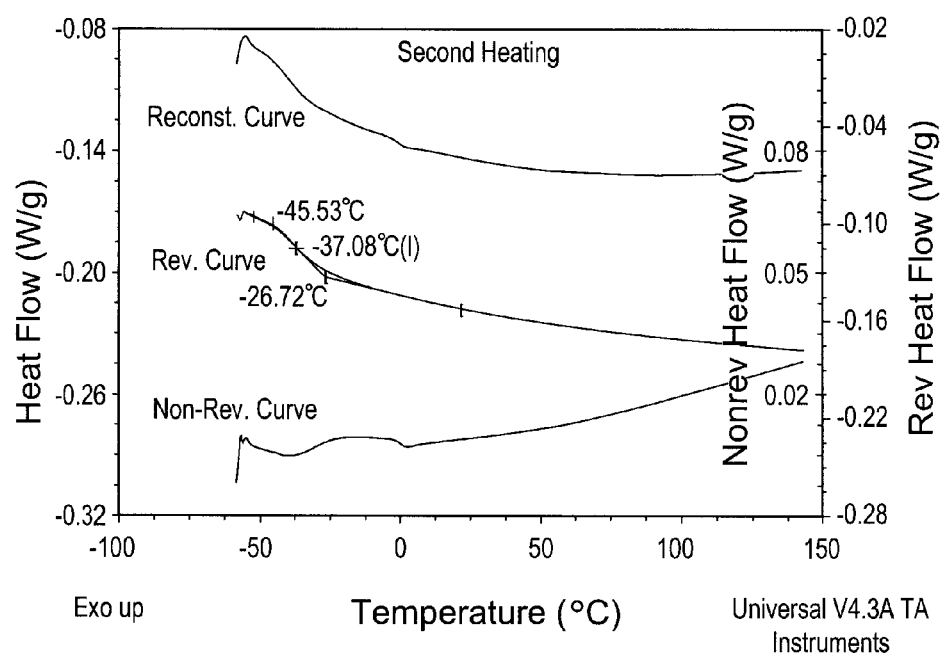
FIG. 1 provides the modulated differential scanning calorimetry (DSC) of the polyurethane dispersion of Example 12.

Substantially solvent-free or solvent-free aqueous polyurethane dispersions falling within the scope of the present invention are provided from particular urethane prepolymers, which also form an aspect of the present invention.

In the prepolymer mixing process, it may be important that the viscosity of the prepolymer is adequately low enough, without dilution by a solvent, to be transported and dispersed in water. The present invention in one embodiment, relates to polyurethane dispersions derived from such a prepolymer, which meets this viscosity requirement and does not have any organic solvent or non-reactive diluent in the prepolymer or in the dispersion.

In accordance with the invention, the prepolymer is the reaction product of at least one polyisocyanate, at least one polyol, at least one isocyanate reactive compound comprising an ionic component, and at least one chain terminating agent.

The present invention may, in some embodiments, provide novel, substantially solvent-free or solvent-free, stable, aqueous polyurethane dispersions, which can be processed and applied directly as one-component adhesive materials (i.e., without the need of any additional adhesive materials) for coating, bonding, and lamination to substrates, by conventional techniques. Aqueous polyurethane dispersions falling within the scope of the present invention may provide: substantially no emission of volatile organic materials; acceptable curing time in production; and good adhesion strength, heat resistance, and stretch/recovery properties in finished products and in practical applications.

As used herein, the term "dispersion" refers to a system in which the dispersed phase consists of finely divided particles, and the continuous phase can be a liquid, solid or gas.

As used herein, the term "aqueous polyurethane dispersion" refers to a composition containing at least a polyurethane or polyurethane urea polymer or prepolymer (such as the polyurethane prepolymer described herein) that has been dispersed in an aqueous medium, such as water, including de-ionized water.

As used herein, the term "solvent," unless otherwise indicated, refers to organic solvents, including volatile organic solvents (such as acetone), alcohols (such as isopropanol, n-propanol), and somewhat less volatile organic solvents (such as methylethyl ketone (MEK), or N-methylpyrrolidone (NMP).

As used herein, the term "solvent-free" or "solvent-free system" refers to a composition or dispersion wherein the composition or dispersed components are not dissolved or dispersed in a solvent or are "substantially solvent-free" meaning the composition or dispersion contains less than 15%, or less than 10%, or less than 5%, or less than 1%, or less than 0.5%, or no more than trace amounts of solvent, e.g. less than 500 ppm, or 0% of solvent on a total weight percentage basis. Unless otherwise specified herein the use of the term "substantially solvent-free" includes "solvent-free". Additionally, if a process is described as solvent-free for making the dispersions and other compositions of this invention, that process (of this invention) includes only steps in which no solvent is added and steps that are "substantially solvent-free" meaning that the reaction mixtures used to make the dispersion and other compositions of this invention contain less than 15%, or less than 10%, or less than 5%, or less than 1%, or less than 0.5%, or 0% of solvent on a total weight percentage basis.

As used herein, the term "non-reactive diluent" or "diluents" unless otherwise indicated, refers to inert plasticizers used to reduce prepolymer viscosity during synthesis. The composition of the present invention in most cases are "diluent free". As used herein, the term "diluent-free" or "diluent-free system" refers to a composition or dispersion that is substantially free of diluent, meaning that the composition or dispersion contains less than 15%, or less than 10%, or less than 5%, or less than 1%, or less than 0.5%, or 0% of diluent on a total weight percentage basis.

Additionally, if a process is described as "diluent-free" for making the dispersions and other compositions of this invention, that process (of this invention) includes only steps in which no diluent is added or substantially no diluent is added, meaning that the reaction mixtures used to make the dispersion and other compositions of this invention contain less than 15%, or less than 10%, or less than 5%, or less than 1%, or less than 0.5%, or 0% of diluent on a total weight percentage basis.

The term "reaction mixture" (unless otherwise defined or apparent in the context where it is used) refers to the combination of the polyisocyanate (i), the polyol (ii), the isocyanate-reactive compound (iii), and the chain-terminating agent (iv) prior to or during the reacting step (a) of the process.

The term "isocyanate terminated prepolymer" (unless otherwise defined or apparent in the context where it is used) refers to the isocyanate-terminated prepolymer resulting from the reaction of the polyisocyanate, the polyol, the isocyanate-reactive compound, and the chain-terminating agent and the prepolymer resulting from the reaction of the polyisocyanate, the polyol, the isocyanate-reactive compound and the chain-terminating agent and at least part or all of the neutralizing agent.

The terms "partially neutralized isocyanate terminated prepolymer" and "neutralized isocyanate terminated prepolymer" refer to prepolymers resulting from the reaction of the polyisocyanate, the polyol, the isocyanate-reactive compound and the chain-terminating agent and at least part or all of the neutralizing agent, respectively.

Any molecular weight reported herein, is a number average molecular weight in grams/mole, unless otherwise indicated.

The aqueous polyurethane dispersion may be made in at least two stages: the first being the formation of the prepolymer and the second stage being the formation of the dispersion. The substantially solvent-free or solvent-free prepolymers for use in stable substantially solvent-free or solvent-free aqueous polyurethane dispersions of the invention are the reaction product of:

a) at least one polyisocyanate which may comprise aliphatic or cycloaliphatic bound polyisocyanate, for example a diisocyanate dicyclohexylmethane 4,4-diisocyanate (H12MDI), b) at least one polyol which may comprise polyether polyol (including co-polyethers), polyester polyol, polycarbonate polyol, polyacetal polyol, polythioether polyol, polyamide polyol, or polyester amide polyol component, for example poly(propylene glycol), poly(tetramethylene ether) glycol, poly(neopentyl glycol adipate), and mixtures thereof c) at least one isocyanate-reactive compound which may comprise an ionic group or a potential ionic group per molecule, such as a carboxylic acid functional group capable of forming a salt upon neutralization and at least two isocyanate-reactive groups per molecule selected from a hydroxyl, a thio, a primary amino, a secondary amino, and combinations thereof; and d) at least one isocyanate chain terminating agent which may comprise hydrophilic ethylene oxide units and one isocyanate-reactive group per molecule selected from a hydroxyl and amino group.

The reaction occurs using a stoichiometric excess of the at least one polyisocyanate component a) described above relative to the sum of the at least one polyol b) and the at least one isocyanate-reactive compound c) to produce an oligomer which may contain urethane and urea functional groups. The amount of the at least one polyisocyanate to be used to make the isocyanate-terminated prepolymer may range from about 20 percent to about 60 percent, or about 20 percent to about 50 percent, or about 20 percent to about 40 percent, or 25 percent to 40 percent by weight of the reaction mixture.

The polyisocyanates (a) useful of the present invention, (used to refer to polyisocyanates which includes diisocyanates), used in the preparation of isocyanate-terminated prepolymer can be selected from the group consisting of liner aliphatic, cycloaliphatic, aromatic and mixtures thereof. Exemplary diisocyanate compounds include but are not limited to, alpha, alpha, alpha$^1$, alpha$^1$-tetramethylxylene diisocyanate (TMXDI); 1-isocyanato-3-isocyanatomethy-3; 5,5-trimethyl-cyclohexane (isophorone diisocyanate (IPDI)) and derivatives thereof; tetramethylene diisocyanate; hexamethylene diisocyanate (HDI) and derivatives thereof; 2,4-toluene diisocyanate (2,4-TDI); 2,6-toluene diisocyanate (2,6-TDI); m-isopropenyl-alpha, alpha-dimethylbenzyl isocyanate; 4,4'-dicyclohexylmethane diisocyante (H12MDI); benzene 1,3-bis(1-iscyanato-1-methylethyl); 1,5 naphthalene diisocyanate (NDI); pphenylene diisocyanate (PPDI); trans-cyclohexane-1,4-diisocyanate (TMI); bitolylene diisocyanate (TODD; 4,4'-diphenylmethane diisocyanate; 4,4'-diphenyl dimethyl methane diisocyanate; di- and tetraalkyl diphenyl methane diisocyanate; 4,4'-dibenzyl diisocyanate; 1,3-phenylene diisocyanate; 1,4-phenylene diisocyanate; the isomers of tolylene diisocyanate; 1-methyl-2,4-diisocyanatocyclohexane; 1,6-diisocyanato-2,2,4-trimethyl hexane; 1,6-diisocyanato-2,4,4-trimethyl hexane; 1,3-bis(isocyanatomethyl)-cyclohexane; 1,4-bis(isocyanatomethyl)-cyclohexane; chlorinated and brominated diisocyanates; phosphorus-containing diisocyanates; 4,4'-diisocyanatophenyl perfluoroethane; tetramethoxy butane-1,4-diisocyanate; butane-1,4-diisocyanate; hexane-1,6-diisocyanate; dicyclohexyl methane diisocyanate; cyclohexane-1,4-diisocyanate; cyclohexane-1,1,2-diisocyanatododecane; 2-diisocyanate; cyclohexane-1,3-diisocyanate; ethylene diisocyanate; phthalic acid-bis-isocyanatoethyl ester; also polyisocyanates containing reactive halogen atoms, such as 1-chloromethylphenyl-2,4-diisocyanate; 1-bromomethylphenyl-2,6-diisocyanate; 3,3-bis-chloromethylether-4,4'-diphenyl diisocyanate; norbonane diisocyanate. Sulfur-containing polyisocyanates may also be used and can be obtained, for example, by the reaction of 2 moles hexamethylene diisocyanate with 1 moles thiodiglycol or dihydroxydihexyl sulfide. Other exemplary polyisocyanates include dimer fatty acid diisocyanate, and partly masked polyisocyanates which provide for the formation of self-crosslinking polyurethanes, for example, dimeric tolylene diisocyanate, or polyisocyanates partly reacted, for example, with phenols, tertiary butanol, phthalimide, caprolactam. The polyisocyanates listed above may be used individually or in admixture.

In one embodiment, the at least one polyisocyanate is at least one diisocyanate and can be selected from aliphatic and cycloaliphatic isocyanated such as hexamethylene diisocyanates (HDI), isophorone diisocyanate (IPDI), and 4,4'-dicyclohexylmethane diisocyante (H12MDI). In other embodiments of the present invention, the diisocyante compound comprises 4,4'-dicyclohexylmethane diisocyante (H12MDI) (trade name Desmodur W, manufactured by Bayer Material Science LLC, Pittsburgh, Pa.). The H12MDI may be used alone, or in combination with one or more other polyisocyanates or diisocyanates such, for example, as those disclosed herein. In these embodiments, at least about 40 weight percent or greater, or at least about 50 weight percent or greater, or at least about 80 weight percent or greater, or about 100 weight percent, based upon the total weight of the at least one polyisocyanate in the reaction mixture, comprises H12MDI. The amount of the at least one polyisocyanate to be used to make the isocyanate-terminated prepolymer may range from about 20 percent to about 60 percent, or about 20 percent to about 50 percent, or about 20 percent to about 40 percent, or 25 percent to 40 percent by weight of the reaction mixture used to make the prepolymer.

As mentioned above, the isocyanate-terminated prepolymer is prepared using at least one polyol. The term "polyol" as used herein refers to any organic compound having 2 or more hydroxyl groups that are capable of reacting with an isocyanate group. The amount of the at least one polyol within the isocyanate-terminated prepolymer reaction mixture may range from about 20 percent to about 80 percent, or about 25 percent to about 80 percent, or about 25 percent to about 75 percent, or about 25 percent to about 65 percent by weight of the prepolymer reaction mixture.

The polyols suitable for preparation of isocyanate-terminated prepolymer may be members of any of the chemical classes of polymeric polyols used or proposed for use in polyurethane formulation, including polyester, polycarbonate, polyether, polyacetal, polythioethers, polyamide, and polyester amide polyols having number average molecular weights Mn of 400 to 8000, or 500 to 5000, or 600 to 3500, or 600 to 3000, or 750 to 2500, or 750 to 2000, or 1000 to 2500, or 1000 to 2000.

The polyols suitable for preparation of isocyanate-terminated prepolymer may also be members of lower molecular weight polyols having number average molecular weights of 60 to 500, or 60 to 400, or 90 to 300. Examples include the difunctional alcohols known from polyurethane chemistry, such as ethanediol; 1,2- and 1,3-propanediol; 1,2-, 1,3- and 1,4-butanediol; 1,5-pentanediol; 1,6-hexanediol; neopentyl glycol; cyclohexane-1,4-dimethanol; 1,2- and 1,4-cyclohexanediol; 2-ethyl-2-butylpropanediol; diols containing ether oxygen (such as diethylene glycol, triethylene glycol, tetraethylene glycol, dipropylene glycol, tripropylene glycol, polyethylene, polypropylene or polybutylene glycols), and mixtures thereof.

Examples of polyester polyols suitable for preparation of isocyanate-terminated prepolymers of the invention include ester glycols with two or more hydroxyl groups. Those ester glycols can be produced by condensation polymerization of polycarboxylic acids or their ester-forming derivatives, and polyols, or their mixtures of low molecular weights with no more than 12 carbon atoms in each molecule. Examples of suitable polycarboxylic acids and their ester-forming derivatives are malonic acid, succinic acid, glutaric acid, adipic acid and their methyl esters, pimelic acid, suberic acid, azelaic acid, sebacic acid, undecanedicarboxylic acid and dodecanedicarboxylic acid, phthalic anhydride and dimethyl terephthalate. Example of suitable polyols for preparing the polyester polyols are ethylene glycol, propylene glycol, 1,3-propanediol, 1,4-butanediol, diethylene glycol, 1,5-pentanediol 1,6-hexanediol, neopentyl glycol, furan dimethanol, glycerol, trimethylolpropane, pentaerythritol, cyclohexane dimethanol, 3-methyl-1,5-pentanediol, 1,7-heptanediol, 1,8-octanediol, 1,9-nonanediol, 1,10-decanediol, 1,12-dodecanediol and mixtures thereof. Polyesters obtained by the polymerization of lactones, for example caprolactone, in conjunction with a polyol may also be used as the polyol.

Polycarbonate polyols suitable for preparation of isocyanate-terminated prepolymer are shown in the following examples. Polycarbonates can be prepared by esterification of carbonic acid with dihydric or polyhydric alcohols and which bear a hydroxyl group at either end of the chain. The alcohols and the polycarbonate diols may have an aliphatic structure. Suitable polyhydric alcohols include dihydric and trihydric alcohol including linear, cyclic and branched structure, for example, ethylene glycol, and glycerol, for example linear dihydric alcohols, or linear dihydric alcohols having 4 to 10 carbon atoms. The hydroxyl groups may be arranged so that they are adjacent, for example in the 1,2-position, or not adjacent. Hydroxy-terminated diols may be used. Specific examples of polymer carbonate polyols include Oxymer® by Perstop Group.

Polyether polyols suitable for preparation of isocyanate-terminated prepolymer include products obtained by the polymerization of a cyclic oxide, for example, ethylene oxide, propylene oxide, trimethylene oxide, tetrahydrofuran, 3-methyltetrahydrofuran, or tetrahydrofuran, or by the addition of one or more such oxides to polyfunctional initiators, for example, water, ethylene glycol, propylene glycol, diethylene glycol, cyclohexane dimethanol, glycerol, trimethylolpropane, pentaerythritol or Bisphenol A. The polyether polyols can also be obtained from condensation polymerization of a polyhydric alcohol, or a diol or diol mixtures, with less than 12 carbon atoms in each molecule, such as ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol 1,9-nonanediol, 1,10-decanediol and 1,12-dodecanediol. Additional exemplary polyethers include polyoxypropylene diols and triols, poly(oxyethylene-oxypropylene) diols and triols obtained by the simultaneous or sequential addition of ethylene oxide and propylene oxide to appropriate initiators and polytetramethylene ether glycols obtained the polymerization of tetrahydrofuran. Further examples of suitable polyols may be found, for example, in U.S. Pat. No. 5,270,433, which is incorporated herein by reference in its entirety.

Polyacetal polyols suitable for preparation of isocyanate-terminated prepolymer are, for example, the compounds obtainable from polymerization of glycols, such as diethylene glycol, triethylene glycol, hexanediol with formaldehyde. Suitable polyacetals may also be prepared by polymerization of cyclic acetals.

Polythioether polyols suitable for preparation of isocyanate-terminated prepolymer can be prepared from the polymerization of thiodiglycol on its own and/or with other glycols, dicarboxylic acids, formaldehyde, aminocarboxylic acids or aminoalcohols. Depending on the co-components, the products are polythioethers, polythio mixed ethers, polythioether esters, polythioether ester amides. Polyhydroxyl compounds such as these may also be used in alkylated form or in admixture with alkylating agents.

The polyester amide polyols and polyamide polyols suitable for preparation of isocyanate-terminated prepolymer can be obtained from polymerization of polybasic, saturated or unsaturated carboxylic acids or their ester and amide-forming derivatives, or their anhydrides with aminoalcohols, polyamines (for example, diamines) and mixtures thereof and also, for example, polyterephthalates.

The polyol component (b) in some embodiments suitable for preparation of isocyante terminated prepolymer may be a difunctional polyol and has number average molecular weight Mn in the range from 400 to 8,000, or in the range from 500 to 5,000, or in the rage from 600 to 3,500. At least one polyol may be a difunctional polyol. Examples of suitable difunctional polyols include polyethylene glycol also known as poly(ethylene oxide), polypropylene glycol also known as polypropylene oxide (PPO) (for example, Voranol™, manufactured by Dow Chemical), poly(ethylene-co-propylene) glycol, polytetramethylene glycol (PTMEG), polycaprolactone diol (for example, CAPA® diol, manufactured by Perstorp), polycarbonate diol (for example, Oxymer®, manufactured by Perstorp), and mixtures thereof. In some embodiments, the at least one difunctional polyol comprises at least about 15 weight percent or greater, or at least about 25 weight percent or greater of a PPO having a number average molecular weight Mn of around 1,000 to 2,000, based upon the total weight of the at least one polyol in the reaction mixture. The polyols may be members of any of the chemical classes of polymeric polyols used or proposed for use in polyurethane formulation, including polyester, polyether, polycarbonate, polyacetal, polythioethers, polyamide, and polyester amide polyols. In some embodiments, the at least one polyol comprises at least about 30 weight percent, or about 40 weight percent, or about 50 weight percent of PPO to the total amount of a polyol or mixtures of polyols.

The isocyanate-terminated prepolymer is formed by combining the at least one isocyanate-reactive compound comprising an ionic group or a potential ionic group per molecule, and at least two isocyanate-reactive groups per molecule, with at least one polyisocyanate and at least one polyol to form a reaction mixture and reacting those components. The isocyanate-reactive groups may comprise hydroxyl group, thio group, primary amino group, a secondary amino group, and combinations thereof. The potential ionic groups are groups that can be converted to ionic groups upon neutralizing with a neutralizing agent. The ionic groups can be formed by neutralizing the corresponding potential ionic groups with a neutralizing agent. The ionic or potential ionic groups may include both cationic and anionic groups. Examples of anionic groups include carboxylate, phosphate and sulfonate. And examples of cationic groups are quaternized nitrogen including ammonium and pyridinium, sulfonium and phosphonium groups. Within the context of this invention, the term "neutralizing agents" is meant to embrace all types of agents which are useful for converting potential ionic groups to ionic groups. Accordingly, this term also embraces quaternizing agents and alkylating agents.

In some preferred embodiments, the ionic groups in the isocyanate-reactive compound for use in the present invention are anionic and include carboxylate and sulfonate groups. The carboxylate and sulfonate groups may be introduced into the prepolymer by reacting hydroxyl- or amino-carboxylic acids, or hydroxyl- or amino-sulfonic acids with the at least one polyisocyanate, and neutralizing the acid groups with a neutralizing agent. Preferred examples of hydroxyl- or amino-carboxylic acids, or hydroxyl- or amino-sulfonic acids are represented by the following general formulas:

$$(HO)_xQ(COOH)_y \quad (1)$$

$$(HO)_xQ(SO_3H)_y \quad (2)$$

$$(NH2)_xQ(COOH)_y \quad (3)$$

$$(NH2)_xQ(SO_3H)_y \quad (4)$$

$$(NH2)_x(NH)^xQ(SO_3H)_y \quad (5)$$

wherein
Q represents a diradical containing 1 to 12 carbon atoms, Q may also include nitrogen, halogen, silicon, and sulfur atoms; and x, x' and y represent an integer of from 1 to 3. Specific examples of these hydroxyl- or amino-carboxylic acids or hydroxyl- or amino-sulfonic acids which may be used to introduce the ionic groups into the isocyanate-terminated prepolymer include the following chemical structures:

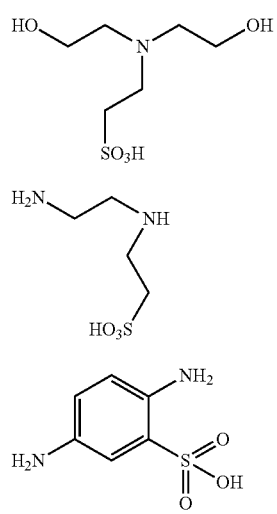

structure 1 structure 2 structure 3

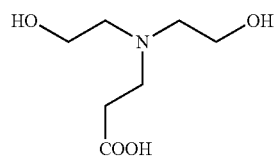

structure 4

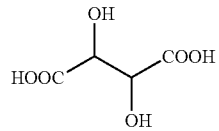

structure 5

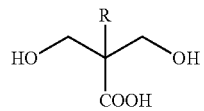

structure 6

Structure 6 represents the general formula of dihydroxyalkanoic acids, wherein R is hydrogen or an alkyl group containing 1 to 12 carbon atoms.

The at least one isocyanate-reactive compound may comprise an ionic group or a potential ionic group per molecule, and at least two isocyanate-reactive groups per molecule that comprise dihydroxyalkanoic acids represented by structure 6 above. Specific examples include dimethylolpropionic acid (DMPA) and dimethylolbutanoic acid (DMBA). The at least one isocyanate-reactive compound is present within the reaction mixture in an amount sufficient to provide an acid number based upon solids ranging from 5 to 40 mg or 10 to 40 mg or 10 to 30 mg, or 14 to 30 mg, or 14 to 28 mg of KOH/g polymer. In this regard, the amount of the at least one isocyanate-reactive compound within the isocyanate-terminated prepolymer may range from about 1 percent to about 10 percent, or 1 percent to 8 percent, or 1 percent to 7 percent, or 1.3 percent to 7 percent, or 1.5 percent to 6 percent by weight of the reaction mixture used to form the prepolymer.

The previously described neutralizing agents are used to convert the potential ionic groups to ionic groups. Suitable neutralizing agents for neutralizing acid groups such as carboxylic acid and sulfonic acid groups include inorganic alkali metals bases such as potassium hydroxide, sodium hydroxide, and lithium hydroxide, ammonia, primary, secondary or tertiary amines.

Examples of neutralizing agents having basic tertiary amino groups which can neutralize or quaternize acid groups such as carboxylic acids and sulfonic acids are listed below:
  (a) Trialkyl-substituted tertiary amines: trimethyl amine, triethyl amine, triisopropyl amine; tributyl amine; N,N-dimethyl-cyclohexyl amine; N,N-dimethylstearyl amine; N,N-dimethylaniline; N-methylmorpholine; N-ethylmorpholine; N-methylpiperazine; N-methylpiperidine; 2-methoxyethyldimethyl amine; 2-(2-dimethylaminoethoxy)-ethanol and 5-diethylamino-2-pentanone. Preferred examples of trialky-substituted tertiary amines are triethylamine, tributyl amine, N-methylmorpholine and N-ethylmorpholine.
  (b) Alcohols having tertiary amino groups, especially alkoxylated aliphatic, cycloaliphatic, aromatic and heterocyclic, secondary amines, e.g. N,N-dimethylethanolamine; N-methyl-N-(3-aminopropyl)-ethanolamine; N-cyclohexyl-N-(3-aminopropyl)propanol-2-amine; N,N-bis-(3-aminopropyl)-ethanol amine; dimethylaminopropanol, N,N-dimethyl-ethanol amine, N,N-diethylethanolamine; N,N-dibutylethanolamine; 1-dimethylaminopropanol-2, N,N-methyl-beta-hydroxyethylaniline; N,N-methyl-beta-hydroxy-propylaniline; N,N-ethyl-beta-hydroxyethylaniline; N,N-butyl-beta-hydroxyethylaniline; N-hydroxyethylpiperidine; N-hydroxyethylmorpholine; alpha-hydroxyethylpyridine and alpha-hydroxyethyl-quinoline. Preferred examples of alcohols are dimethylaminopropanol; N,N-dimethyl-ethanol amine and N,N-diethylethanolamine, (c) Diols and triols having tertiary amino groups, especially alkoxylated aliphatic, cycloaliphatic, aromatic and heterocyclic primary amines, e.g. triethanol amine, N-3-aminopropyldiethanolamine; N-methyldiethanolamine; N-butyldiethanolamine; N-oleyl-diethanolamine; N-cyclohexyldiethanolamine; N-methyl-diisopropanolamine; N-cyclohexyl-diisopropanolamine; N,N-dioxaethylaniline; N,N-dioxaethyl-m-toluidine; N,N-dioxaethyl-p-toluidine; N,N-dioxypropyl-naphthylamine; N,N-tetraoxaethyl-alpha-aminopyridine; dioxaethylpiperazine, polyethoxylated butyldiethanolamine, polypropoxylated methyldiethanolamine (molecular weight 1000), polypropoxylated methyl diethanolamine (molecular weight 2000), polyesters with tertiary amino groups, tri-(2-hydroxypropyl) amine; N,N-di-n-(2,3-dihydroxypropyl)-aniline; N,N'-dimethyl-N,N'-bis-oxaethylhydrazine and N,N'-dimethyl-N,N'-bis-oxypropyl-ethylenediamine.

Preferred examples of diols and triols include triethanol amine; N-3-aminopropyldiethanolamine; N-methyldiethanolamine and N-butyldiethanolamine (d) Primary amines having tertiary amino groups, e.g. N,N-dimethylhydrazine; N,N-dimethyl-ethylenediamine; 1-diethylamino-4-aminopentane; alpha-aminopyridine; 3-amino-N-ethylearbazole; N,N-dimethyl-propylene-diamine; N-amino-propyl-piperidine; N-aminopropyl-morpholine; N-aminopropylethyleneimine and 1,3-bis-piperidine-2-aminopropane.

(e) Diamines and triamines having tertiary amino groups, especially compounds obtained by hydrogenation of addition products of acrylonitrile to primary and di-secondary amines e.g. bis-(3-aminopropyl)-methylamine, bis-(3-aminopropyl)-cyclohexylamine, bis-(3-aminopropyl)-aniline, bis-(3-aminopropyl)-toluidine, diaminocarbazole, bis-(aminopropoxyethyl)-butylamine, tri-(aminopropyl)amine; N,N-bis-carbonamidopropylhexamethylene-diamine; and products obtained by the addition of acrylamide to diamines and diols.

The more volatile tertiary amines, for example those having a boiling point less than 100° C., when used as neutralizing agent(s) can be advantageous since the salts formed from these amines are capable of decomposing during film formation with volatilization of the tertiary amine to yield products which have increased resistance to water, the volatization of the tertiary amine also frees the carboxylate to acid form to allow for crosslinking reaction with carboxylic acid-reactive crosslinker. An advantage of using tertiary amines as the neutralizing agent is that they do not take part in the isocyanate-polyaddition reaction. In contrast, when isocyanate-terminated prepolymers containing carboxylic acid groups are formed, it would be difficult to neutralize these groups prior to dispersion in water with hydroxyalkyl-containing amines or primary or secondary amines due to the fact that those amines will react with the free isocyanate groups of the prepolymer. In this context, the primary and secondary amines act more like chain terminators or chain extenders than neutralizing agents, and make the subsequent high molecular weight build-up during the aqueous chain extension step more difficult and less predictable.

Thus, if primary and secondary amines are used, they may be used as neutralizing agents prior to the formation of the prepolymer, i.e., when the potential ionic groups are converted to ionic groups prior to their incorporation into the prepolymer. The tertiary amines may be used prior to or after the formation of the prepolymer to neutralize the potential ionic groups. Examples of the tertiary amines used in the present invention as the neutralizing agent include trimethyl amine, triethyl amine, triisopropyl amine, tributyl amine, N,N-dimethyl-cyclohexyl amine, N,N-dimethyl-ethanol amine, N,N-diethyl-ethanol amine, triethanol amine, N-methyldiethanol amine, dimethylaminopropanol, and 2-methoxyethyldimethyl amine.

When the potential ionic groups of the prepolymer are neutralized, they provide hydrophilicity to the prepolymer and enable it to be more stably dispersed in water. The potential or unneutralized ionic groups do not provide this degree of hydrophilicity. The amount of neutralizing agent that is used may be important in affecting the aqueous polyurethane dispersion. In this connection, it is believed that too much neutralization may result in a water soluble polymer that yields a polymer solution rather than a dispersion whereas too little neutralization may result in an unstable dispersion. Accordingly, it may be desirable that a sufficient amount of the potential ionic groups be neutralized so that the final product will be a stable, colloidal dispersion. When large amounts of potential ionic groups are incorporated into the prepolymer, only a portion of these groups may need to be neutralized to provide the necessary amount of hydrophilicity. However, when small amounts of potential ionic groups are incorporated, it may be necessary to neutralize substantially all of these groups to obtain the desired amount of hydrophilicity. In the present invention, the amount of neutralizing agent that is added is sufficient to react about 40 to 150 molar percent, or about 45 to 145 molar percent, or about 45 to 140 molar percent, or 45 to 120 molar percent, or 45 to 105 molar percent, or 45 to 100 molar percent, or 45 to 95 molar percent of the acid groups contained within the isocyanate-reactive compound.

The neutralization steps may be conducted by the following:

(1) prior to prepolymer formation by treating the component containing the potential ionic group(s), (2) after prepolymer formation, but prior to dispersing the prepolymer in water, (3) by adding the neutralizing agent to all or a portion of the dispersing water, or (4) a combination of (2) and (3) above.

Conducting the neutralization step after the prepolymer formation, but prior to dispersing the prepolymer in water would provide advantage of better dispersiblity of the prepolymer in water compared to adding the neutralizing agent to the water in the dispersing step. Without being bound to theory, it is believed that neutralizing agents neutralize the potential ionic groups such as carboxylic acid more efficiently in the bulk prepolymer than in a dispersed state in water because of the higher concentration of the neutralizing agent and potentially ionic groups. Because the neutralizing step converts the potential ionic groups such as carboxylic acids to ionic carboxylate and the ionic groups such as carboxylates provide neutralized prepolymer with better hydrophilicity and thus better dispersibility in water and particles of the prepolymer dispersion are more uniform. If the neutralizing step is carried out in water during the dispersing step, the prepolymer would not disperse as well as the neutralized prepolymer, therefore the particle sizes of the prepolymer dispersion are not as uniform and the neutralizing reaction is not as effective. The more effectively neutralized prepolymer disperses better in water and yields a dispersion with better stability and more uniform dipersion particle size. Stable and uniform particle size is critical for certain applications, for example, electronic applications where feature size is small.

Alternatively, a portion of the neutralizing agent can be used to neutralize the potential ionic groups such as acid groups including carboxylic acid and sulfonic acid in the prepolymer before dispersing the prepolymer in water, and the remaining amount of the neutralizing agent may be added to the water during the dispersing step, as stated in process (4) above. The advantage of neutralizing or partially neutralizing the prepolymer before dipersing in water would be more evident where the stability and dispersibility of the polyurethane prepolymer in water is marginal due to minimum amounts of potential ionic groups.

In some embodiments of the present invention, a portion or the entire amount of the neutralizing agent is added to the prepolymer prior to the dispersing in water. The neutralization reaction between the neutralizing agent and the potential ionic groups may be conducted between from about 20° C. to 150° C., but is normally conducted at temperatures below 120° C., or between from about 25° C. to 100° C., or between from about 25° C. to 80° C., with agitation of the reaction mixture.

The isocyanate-terminated prepolymer is further reacted with one or more chain terminating agents in the reaction mixture. Chain terminating agents are utilized to control molecular weight of the polyurethane prepolymer contained within the aqueous dispersion, and to control the viscosity of the prepolymer which may be an important process parameter for a substantially solvent-free or solvent-free prepolymer system. The amount of chain terminating agent present may range from 0.1 percent to about 30 percent, or at least 0.4 percent, or from about 0.5 percent to about 28 percent, about 1 percent to about 25 percent, or from about 1 percent to about 22 percent, or from about 2 percent to about 20 percent, or about 2.5 percent to about 20 percent, or about 3 percent to about 20 percent, or about 4 percent to about 20 percent, or about 5 percent to about 20 percent, or at least 4 percent, or at least 5 percent by weight of the reagents in the reaction mixture used to form the prepolymer (not including the neutralizing agent) and of the resulting prepolymer. Or the amount of chain terminating agent present may range from 1 percent to about 30 percent, or from about 1 percent to about 25 percent, about 2 percent to about 25 percent, or from about 2 percent to about 22 percent, or from about 2 percent to about 20 percent, or about 4 percent to about 20 percent, or about 5 percent to about 20 percent, or about 8 percent to about 20 percent, or about 10 percent to about 20 percent, or greater than 5 percent by molar ratio to the total isocyanate-reactive groups in the prepolymer or the reagents in the reaction mixture used to form the prepolymer (not including the neutralizing agent).

The chain terminating step can be carried out prior to or after neutralization step. The chain terminating agent can be added to the reaction mixture at the beginning or during or near the end of prepolymer preparation. The amount of chain terminating agent that is added is sufficient to react about 2 to 50 molar percent, or about 5 to 50 molar percent, or about 10 to 50 molar percent, or about 15 to 50 molar percent of the remaining isocyanate groups contained in the prepolymer. Compounds, particularly monofunctional compounds containing active hydrogen, such as those containing hydroxyl, amino, and thio groups are useful as chain terminating agents. The chain terminating agents that have one active hydrogen per molecule react with the isocyanate groups in the reaction mixture.

Examples of suitable monofunctional chain terminating agents include alcohols, mercaptans, amino alcohols, monohydroxyl, mono-mercapto or mono-amino terminated oligomers and polymers, ammonia, primary or secondary aliphatic, alicyclic, aromatic, araliphatic or heterocyclic amines, hydroxy carboxylic acid, mercapto carboxylic acid, amino carboxylic acid, hydroxy sulfonic acid, mercapto sulfonic acid, and aminosulphonic acids.

Examples of mono-amino containing compounds suitable as chain terminating agents include primary aliphatic amines such as ethylamine, hexyl amine and aniline, secondary amine such as dialkylamine specifically di-n-butylamine, and morpholine.

Examples of alcohols suitable as monofunctional chain terminating agents include but are not limited to ethanol, 1-propanol, 2-propanol, n-butanol, secondary butanol, n-hexanol and its isomers, 2-ethylhexyl alcohol, ethylene glycol monomethyl ether, diethylene glycol monomethyl ether, ethylene glycol monobutyl ether, diethylene glycol monobutyl ether, propylene glycol monomethyl ether, dipropylene glycol monomethyl ether, tripropylene glycol monomethyl ether, propylene glycol monobutyl ether, dipropylene glycol monobutyl ether, tripropylene glycol monobutyl ether, 1-octanol, 1-dodecanol, 1-hexadecanol, lauryl alcohol, stearyl alcohol and ethoxylated alchohols such as Tomadol® surfactants manufactured by Air Products. The chain terminating agents will be substantially or completely consumed in the chain terminating reaction and will be incorporated into the prepolymer and the polyurethane polymer.

Examples of mercaptans suitable as monofunctional chain terminating agents include but are not limited to ethanethiol, 1-propanethiol, 1-butanethiol, 1-pentanethiol, n-hexanethiol, n-heptanethiol, n-octanethiol, nonyl mercaptan, 1-decanethiol, 1-dodecanethiol, 1-hexadecyl mercaptan, octadecyl mercaptan, isobutyl thiol, cyclohexyl mercaptan, 3-methyl-1-butanethiol, and 3-chloro-1-propanethiol.

Examples of hydroxyl and mercapto carboxylic acids suitable as monofunctional chain terminating agents include but are not limited to glycolic acid (2-hydroxyacetic acid), hydroxypivalic acid, lactic acid, 3-hydroxybutyric acid, 4-hydroxybutyric acid, 10-hydroxydecanoic acid, hydroxypivalic acid (2,2-dimethyl-3-hydroxypropionic acid), 12-hydroxydodecanoic acid, 16-hydroxyhexadecanoic acid, citric acid, thioglycolic acid, thiolactic acid, 3-mercaptopropionic acid, lactic acid, trichloro-lactic acid, malic acid, citric acid, salicyclic acid, hydroxy-benzoic acid, hydroquinone-2,5-dicarboxylic acid, 4-hydroxyisophthalic acid, hydroxyterephthalic acid, 1-hydroxy-2-naphthoic acid, 3-hydroxypropionic acid, and mercaptosuccinic acid. Some preferred examples of hydroxy and mercapto carboxylic acids are thioglycolic acid, glycolic acid, 3-mercaptopropionic acid, 4-hydroxybutyric acid, and hydroxypivalic acid. In some embodiments, the amount of hydroxy and mercapto carboxylic acids as chain terminating agents is at least 0.1% to 10%, or at least 0.1% to 8%, or at least 0.2% to 6%, or at least 0.4% to 5%, or at least 0.5% to 5%, or at least 0.5% to 4%, or at least 0.5% to 3%, or at least 0.5% to 2% by weight of the prepolymer or the reagents in the reaction mixture used to form the prepolymer. In other embodiments, the amount of hydroxyl and mercapto carboxylic acids as chain terminating agents is at least 1% to 20%, or at least 2% to 18%, or at least 2% to 15%, or at least 3% to 15%, or at least 3% to 13% by molar ratio to the total isocyanate-reactive groups in the prepolymer or the reagents in the reaction mixture used to form the prepolymer.

Examples of aminocarboxylic acids include but are not limited to: N-methylglycine (sarcosine), isonipecotic acid, proline, 1- and 2-alanine, 6-aminocaproic acid, 4-aminobutyric acid, 2-hydroxy-3-carbazolecarboxylic acid, glycine, methionine, 6-aminocaproic acid, 6-benzoyl-amino-2-chlorocaproic acid, aspartic acid, glutamic acid, histidine, anthranilic acid, 2-ethylamino-benzoic acid, N-(2-carboxyphenyl)aminoacetic acid, 2-(3'-aminobenzenesulphonylamino)-benzoic acid, 3-aminobenzoic acid, 4-aminobenzoic acid, N-phenylaminoacetic acid, 5-aminobenzenedicarboxylic acid, 5-(4'-aminobenzoyl-amino)-2-aminobenzoic acid, iminodiacetic acid, and ethylenediamine-N,N'-diacetic acid. Some preferred examples of aminocarboxylic acids in the present invention are iminodiacetic acid, N-methylglycine, glycine, 1- and 2-alanine, isonipecotic acid, proline, and 4-aminobutyric acid.

Examples of hydroxyl, and mercapto sulphonic acids suitable as monofunctional chain terminating agents include but are not limited to 2-hydroxyethanesulphonic acid, phenol-2-sulphonic aci, phenol-3-sulphonic acid, phenol-4-sulphonic acid, phenol-2,4-disulphonic acid, 2-hydroxybenzoic acid-5-sulphonic acid, naphthol-1-sulphonic acid, naphthol-1-disulphonic acid, 8-chloronaphthol-1-disulphonic acid, naphthol-1-trisulphonic acid, naphthol-2-sulphonic acid, naphthol-2-trisulphonic acid, 2-hydroxynapthoic acid-3-sulphonic acid-6,2-hydroxycarbazole-7-sulphonic acid, hydroxypropane sulfonic acid, hydroxyhexadecanoic acid, mercaptoethane sulfonic acid, mercaptopropane sulfonic acid, Examples of aminosulphonic acids suitable as monofunctional chain terminating agents include but are not limited to aminopropane sulfonic acid, hydrazine-disulphonic acid, 4-aminobenzenesulfonic acid, N-phenyl-aminomethanesulphonic acid, 4,6-dichloroanilin-2-sulphonic acid, N-acetyl-naphthylamine-1-sulphonic acid-3, naphthylamine-1-sulphonic acid, naphthylamine-2-sulphonic acid, naphthylamine-disulphonic acid, naphthylamine-trisulphonic acid, phenylhydrazine-2,5-disulphonic acid, 4'-aminostilbene-2,2'-disulphonic acid, carbazole-disulphonic acid-2,7, taurine, methyl-taurine, butyltaurine, 3-amino-1-benzoic acid-5-suphonic acid, and 3-amino-toluene-N-methane-sulphonic acid.

Examples of hydroxyl-terminated and amino-terminated oligomers and polymers useful as chain terminating agents include poly(ethylene oxide) monomethyl ether (MPEG), poly(ethylene oxide) monoethyl ether, poly(ethylene oxide) monobutyl ether, poly(ethylene oxide) monocarboxylic acid, amino poly(ethylene oxide) monocarboxylic acid, amino poly(ethylene oxide) monomethyl ether, poly(propylene oxide) monomethyl ether, poly(propylene oxide) monoethyl ether, amino poly(propylene oxide) monomethyl ether. The number average molecular weights, Mn, of oligomers and polymers useful as chain terminating agents may be less than 2000 or less than 1000 or may be from about 200 to about 2000, or from about 200 to about 1500, or from about 250 to about 1000 or from about 250 to about 750 g/mol, or about 250 to about 600 g/mol.

After incorporating the chain terminating agents into the prepolymer, the carboxylic acid and/or sulfonic acid groups in the above mentioned chain terminating agents can also be neutralized by a neutralizing agent in the neutralizing step to form ionic groups in the prepolymer, in the same way as the ionic groups in prepolymer main chain are as described above. The polymer chain end ionic groups also provide ionic stability to the polymer in water as the ionic groups in the main chain of prepolymer do.

The above mentioned chain terminating agents can be used individually or in admixture comprising one or more chain terminating agents.

In some embodiments of the present invention, chain terminating agents comprise oligomers and polymers containing hydrophilic ethylene oxide units. The ethylene oxide units provide additional hydrophilicity to the polyurethane prepolymer contained in the aqueous dispersion and render dispersion more stable. Specific examples of some chain terminating agents useful in the present invention are oligomers and polymers of poly(ethylene oxide) monoalkyl ether of a number average molecular weight, Mn, in the range of 250 to 1000, or in the range of 250 to 750, or 250 to 600. In other embodiments of the present invention, chain terminating agents comprise a mixture of poly(ethylene oxide) monoalkyl ether with other chain terminating agents such as glycolic acid, and n-dibutylamine. In some preferred embodiments, the amount of the chain terminating agent, for example those comprising hydrophilic ethylene oxide units, constitutes about 2 to 30 percent, or 2 to 27 percent, or 2.5 to 27 percent, or 3 to 27 percent, or 4 to 25 percent, or 4.5 to 20 percent by weight of the prepolymer or the reagents in the reaction mixture used to form the prepolymer. In other preferred embodiments, the chain terminating agent comprising hydrophilic ethylene oxide units and one isocyanate-reactive group per molecule and may constitute at least 2 to 25, or 3 to 25, or 4 to 20, or 5 to 20 percent by molar ratio to the total isocyanate-reactive groups in the prepolymer or the reagents in the reaction mixture used to form the prepolymer. The amount of chain terminating agent(s) used to form the prepolymer is (are) such that will substantially completely react with and become part of the prepolymer and part of the polyurethane polymer. The chain terminating reactions can be carried out at the beginning of the prepolymer synthesis by adding the chain terminating agents up front with other components of the reaction mixture to react with isocyanate groups or during or near the end of the prepolymer synthesis after the isocyante groups have reacted with the polyols and potential ionic components, but preferably before the reaction with the neutralization agent.

In one embodiment, the present invention comprises the composition and process of making a substantially solvent-free or solvent-free isocyanate-terminated prepolymer for use in stable substantially solvent-free or solvent-free aqueous polyurethane dispersions comprising a) at least one polyisocyanate comprising aliphatic or cycloaliphatic bound polyisocyanate, for example a diisocyanate dicyclohexylmethane 4,4-diisocyanate (H12MDI), b) at least one polyol including polyether (including co-polyethers), polyester, polycarbonate, polyacetal, polythioethers, polyamide, or polyester amide polyol component, for example poly(propylene glycol), poly(tetramethylene ether) glycol, poly(neopentyl glycol adipate).

c) at least one isocyanate-reactive compound comprising an ionic group or a potential ionic group per molecule, such as a carboxylic acid functional group capable of forming a salt upon neutralization and at least two isocyanate-reactive groups per molecule selected from a hydroxyl, a thio, a primary amino, a secondary amino, and combinations thereof; and d) at least one isocyanate chain terminating agent comprising hydrophilic ethylene oxide units and one isocyanate-reactive group per molecule selected from a hydroxyl and amino group.

The isocyanate-terminated prepolymer is the reaction product of a polyisocyanate component a), and polyols component b) which are components containing isocyanate-reactive groups, ionic component c), and chain terminating agent d). The ratio of isocyanate groups to isocyanate-reactive groups is maintained between about 1.1 to 4.0, or about 1.1 to 3.0, or about 1.1 to 2.0 on an equivalent basis in the reaction mixture. The above components may be reacted simultaneously or sequentially to produce the isocyanate-terminated prepolymer. Simultaneous reaction may lead to the production of random copolymers, whereas a sequential-type reaction will lead to the production of block copolymers. It is desirable to maintain an excess of isocyanate groups in order to control the molecular weight of the prepolymer and prevent high prepolymer viscosities during prepolymer preparation. In some embodiments, the isocyanate-terminated prepolymer and the reaction mixture used to form it may comprise from 20 to 60, or 20 to 50, or 20 to 40, or 25 to 40 percent by weight of the at least one polyisocyanate, from 20 to 80, or 25 to 80, or 25 to 75, or 20 to 70, or 25 to 65 percent by weight of the at least one polyol, from 1 to 10, or 1 to 8, or 1 to 7, or 1 to 6, or 1.3 to 7, or 1.5 to 6 percent by weight of the at least one isocyanate-reactive compound, and from 0.1 to 30, or 0.4 to 30, or 0.5 to 28, or 1 to 25, or 2 to 20, or 5 to 20 percent by weight of the at least one isocyanate chain terminating agent. The amount of the at least one polyisocyanate, the at least one polyol, the at least one isocyanate-reactive compound, and the at least one isocyanate chain terminating agent added to the reaction should be such that they are substantially (or fully) consumed by the reaction and become part of the molecules of the prepolymer. The amount of the neutralizing agent and the cross-linking agent also should be adjusted so they too are substantially (or fully) consumed by the reaction and become part of the molecules of the prepolymer and/or the molecules of the polyurethane polymer.

The isocyanate-terminated prepolymer is typically prepared in a suitable reactor wherein the reactants are suitably combined, mixed, and reacted, and wherein heat may be transferred in to, and away from, the reactor. The synthesis of the isocyanate-terminated prepolymer may be conducted in an atmosphere that minimizes or eliminates the introduction of water into the reaction mixture such as a nitrogen and/or inert atmosphere. The reactants may be added slowly as in a semi-batch process over time, continuously, or quickly as a batch-wise process into the reactor. Typically, the reactants are gradually added to the reactor. The reactants may be added in any particular order.

The reaction temperature during prepolymer production is normally maintained below about 150° C., or between about 50° C. and 130° C., or between 70 to 120° C. The reaction is maintained at the temperature until the amount of unreacted isocyanate-reactive groups is substantially zero and the weight percent free isocyanate groups (NCO) is between about 0.75% to 8%, or about 1% to 8%, or about 1% to 6%, or about 1% to 5% by weight, based on the weight of prepolymer solids.

Optionally, the reaction mixture may further comprise a catalyst to shorten the overall reaction time. In general, the amount of the catalyst present during the reaction may range from about 0.02% to about 0.08%, or about 0.04% to about 0.07%, or about 0.055% to about 0.065% by weight of the reaction mixture. Suitable catalysts include tin based materials such as di-butyl tin dilaurate, dibutylbis(laurylthio) stannate, dibutyltinbis(isooctylmercapto acetate) and dibutyltinbis(isooctylmaleate), and tin octaoate. Still other suitable catalysts include tertiary amines such as DABCO, pentametyldipropylenetriamine, bis(dimethylamino ethyl ether), pentamethyldiethylenetriamine, DBU phenol salt, dimethylcyclohexylamine, 2,4,6-tris(N,N-dimethylaminomethyl)phenol (DMT-30), 1,3,5-tris(3-dimethylaminopropyl) hexahydro-s-triazine, and ammonium salts. The catalyst remains in the final polyurethane dispersion and may have adverse effect especially for electronic applications where high purity is highly desirable.

In the present invention, the reaction may be conducted without a catalyst. For the embodiments described herein, no catalyst was used in the reactions. The term "catalyst-free" will be used to describe a process that does not use or require a catalyst to form the prepolymer and/or dispersion. "Catalyst free" for example tin catalyst free product is highly desirable as environmental friendly product.

It is desired to maintain a sufficiently low prepolymer bulk viscosity to enhance the formation of the prepolymer dispersion in water and to provide a uniform dispersion. The viscosity range for the prepolymer should be between 500 centipoise (cps) to 15,000 centipoise, or between about 800 to 13,000 centipoise, or between 1,000 to 12,000, or between 1,200 to 10,000, or between 1,200 to 9,000 centipoise when measured at 80° C.

After the prepolymer is formed, one or more neutralizing agents may then be added to the prepolymer and allowed to react for a time ranging from 5 to 30 minutes or longer. Or the neutralizing agents may be added during the prepolymer dispersion step by adding it into the water before the prepolymer is added, or at the same time as the prepolymer is added to the water, or after the prepolymer is added to the water, and allowed to react with the prepolymer for a time ranging from 5 to 30 minutes or longer. Or a portion of the neutralizing agents may be added to, contacted to, or mixed into, the prepolymer after it is formed and the remaining portion of the neutralizing agents may be added to the water before or during the prepolymer dispersion step.

After the isocyanate-terminated prepolymer is prepared, the prepolymer is then dispersed in water. Agitation during the formation of the dispersion is desired. The isocyanate-terminated prepolymer may be dispersed in water using techniques well known in the art. This may be done according to the following methods:

(1) Water is added to the prepolymer with agitation. During this process, the viscosity of the mixture increases, since initially the organic prepolymer phase is continuous. As the addition of water is continued, a point is reached where a phase change occurs and the aqueous phase becomes continuous and the viscosity of the mixture decreases relative to the viscosity of the prepolymer. The remaining portion of the water is then added. If a portion or all neutralizing agents are added to the dispersing water for neutralization, it may be desired that sufficient ionic groups are present to produce a stable dispersion at the point of phase change when combined with the hydrophilic effect of hydrophilic ethylene oxide units of chain terminating agents. This problem may be obviated by adding all of the neutralizing agents with a portion of the dispersing water which is insufficient to cause the phase change, followed by the addition of the remaining water. This problem may also be overcome by incorporating more hydrophilic ethylene oxide units and/or potential ionic groups into the prepolymer, or by using an excess of the neutralizing agent. These latter methods, may be used to ensure that the prepolymer is sufficiently hydrophilic at the point of phase change to form a stable dispersion.

(2) The prepolymer is added to the water or water-neutralizing agent mixture, either in a batch-type process or continuous process. When prepolymer is added to water, significant increases in viscosity do not occur.

In the present invention, the prepolymer may be added to the water or water-neutralizing agent mixture. The prepolymer is usually added in increments. The aqueous mixture may be agitated during the addition of the prepolymer to assist in forming the dispersion.

After and/or during the dispersing step, one or more chain extending agents (also refered to as chain extenders) may be added and allowed to react with isocyante terminated prepolymer to provide the aqueous polyurethane dispersion. Upon reaction between the prepolymer and the chain extending agents the polyurethane polymer and the polyurethane dispersion is created.

In one embodiment of the present invention, the isocyante terminated prepolymer may be prepared in a first reactor, and the dispersion step may be carried out in a second reactor. In the second reactor, an appropriate amount of water to produce an aqueous dispersion containing from about 30 to about 40 percent by weight of solids may be added. The prepolymer from the first reactor is then added to the reactor containing the water in second reactor with sufficient agitation to produce a translucent to white dispersion. Typically the contents from the first reactor are added to the second reactor containing the water. Care may be taken at this point not to allow the temperature in the second reactor to go above 40° C. to minimize terminal isocyante groups of prepolymer reacting with water. Once the dispersion step is complete, one or more chain extending agents may be added to the reactor. The chain extending agents may be added before heating so that it is before the reaction of the terminal isocyanate groups with water proceeds to any significant extent, normally within about 30 minutes, or within about 15 minutes after the prepolymer is dispersed in water. After the addition of the chain extending agents, the reaction may be heated to one or more temperatures ranging from 50 to 85° C. for a time that may range from 15 minutes to 3 hours to complete the chain extension reaction. After the chain extension reaction, the polyurethane dispersion is formed, and may then be cooled to 35° C. and collected.

Ideal chain extending agents contain at least two isocyante reactive functional groups that are capable of reacting with isocyanate groups in prepolymer. They may contain reactive hydrogen atoms such as hydroxyl, thio, or amino groups in any combination. The exemplary chain extending agents include the following:

a) saturated and unsaturated glycols, such as ethylene glycol or condensates of ethylene glycol, butane-1,3-diol, butane-1,4-diol, butenediol, propane-1,2-diol, propane-1,3-diol, neopentyl glycol, hexanediol, bis-hydroxymethyl cyclohexane, dioxyethoxy hydroquinone, terephthalic acid-bis-glycol ester, succinic acid di-2-hydroxyethyl amide, succinic acid di-N-methyl-(2-hydroxyethyl)-amide, 1,4-di-(2-hydroxymethylmercapto)-2,3,5,6-tetrachlorobenzene, 2-methylenepropane-1,3-diol, 2-methylpropane-1,3-diol;

b) aliphatic, cycloaliphatic and aromatic diamines, such as 1,2-ethylenediamine, 1,4-butanediamine,hexamethylenediamine, 1,3-bis(aminomethyl)cyclohexane, 1,4-bis(aminomethyl)cyclohexane, 1,5-diamino-1-methylpentane, 3,3-dimethyl-1,5-pentanediamine, norbornediamine, 4,4'-methylene-bis(cyclohexylamine) (also named bis-(4-aminocyclohexyl)-methane), 2,2-dimethyl-1,3-propanediamine, 2-methyl-1,5-pentanediamine, 1,12-dodecanediamine, 1,2-propanediamine, 1-amino-3-aminomethyl-3,5,5-trimethyl-cyclohexane (also named isophorone diamine or IPDA), 1,2-cyclohexanediamine (also named 1,2-diaminocyclohexane) (cis/trans), bis-(4-amino-3-methylcyclohexyl)-methane, 1,4-cyclohexanediamine(cis/trans, trans), piperazine, N,N'-bis-(2-aminoethyl)piperazine, bis-(4-amino-3-methylcyclohexyl)-methane, N-methyl propylenediamine, diaminodiphenylsulfone, diaminodiphenyl ether, diaminodiphenyl dimethylmethane, meta-tetramethylxylenediamine, and Jeffamine® (Texaco) of molecular weight less than 500, 2,4-diamino-6-phenyl triazine, dimer fatty acid diamine. Other diamines such as hydrazine, diaminodiphenyl methane or the isomers of phenylenediamine, also carbohydrazides or hydrazides of dicarboxylic acids can be used as chain extending agents;

c) aminoalcohols, such as ethanolamine, propanolamine, butanolamine, N-methyl ethanolamine, N-methyl isopropanolamine;

d) aliphatic, cycloaliphatic, aromatic and heterocyclic diaminocarboxylic acids, such as glycine, 1- and 2-alanine, 6-aminocaproic acid, 4-aminobutyric acid, the isomeric mono- and diaminobenzoic acids, the isomeric diaminonaphthoic acids; and water.

Special chain extending agents containing at least one basic nitrogen atom are, for example, mono-, bis- or polyalkoxylated aliphatic, cycloaliphatic, aromatic or heterocyclic amines, such as N-methyl diethanolamine, N-ethyl diethanolamine, N-propyl diethanolamine, N-isopropyl diethanolamine, N-butyl diethanolamine, N-isobutyl diethanolamine, N-oleyl diethanolamine, N-stearyl diethanolamine, ethoxylated coconut oil fatty amine, N-allyl diethanolamine, N-methyl diisopropanolamine, N-ethyl diisopropanolamine, N-propyl diisopropanolamine, N-butyl diisopropanolamine, C-cyclohexyl diisopropanolamine, N,N-diethoxylaniline, N,N-diethoxyl toluidine, N,N-diethoxyl-1-aminopyridine, N,N'-diethoxyl piperazine, dimethyl-bis-ethoxyl hydrazine, N,N'-bis-(2-hydroxyethyl)-N,N'-diethylhexahydrop-phenylenediamine, N-12-hydroxyethyl piperazine, polyalkoxylated amines, such as propoxylated methyl diethanolamine, also such compounds as N-methyl-N,N-bis-3-aminopropylamine, N-(3-aminopropyl)-N,N'-dimethyl ethylenediamine, N-(3-aminopropyl)-N-methyl ethanolamine, N,N'-bis-(3-aminopropyl)-N,N'-dimethyl ethylenediamine, N,N'-bis-(3-aminopropyl)-piperazine, N-(2-aminoethyl)-piperazine, N,N'-bisoxyethyl propylenediamine, 2,6-diaminopyridine, diethanolaminoacetamide, diethanolamidopropionamide, N,N-bisoxyethyl-phenyl thiosemicarbazide, N,N-bis-oxyethylmethyl semicarbazide, p,p'-bis-aminomethyl dibenzyl methylamine, 2,6-diaminopyridine,2-dimethylaminomethyl-2-methylpropane 1,3-diol.

Chain extending agents containing halogen atoms or R—SO$_2$O groups capable of quaternization are, for example, glycerol-1-chlorohydrin, glycerol monotosylate, pentaerythritol-bis-benzenesulfonate, glycerol monomethanesulfonate, adducts of diethanolamine and chloromethylated aromatic isocyanates or aliphatic haloisocyanates, such as N,N-bis-hydroxyethyl-N'-m-chloromethyl phenylurea, N-hydroxyethyl-N'-chlorohexyl urea, glycerol monochloroethyl urethane, bromoacetyl dipropylene triamine, chloroacetic acid diethanolamide.

In some embodiments in this invention, the short-chain isocyanate-reactive diamine compounds suitable as chain-extending agents include: 1,2-ethylenediamine, 3,3-dimethyl-1,3-propylenediamine (neopentyl diamine), 1,6-hexamethylenediamine (NMDA), isophorone diamine (IPDA), 1,4-bis(aminomethyl)cyclohexane (1,4-BAC), 1,3-bis(aminomethyl)cyclohexane (1,3-BAC), 4,4'-methylene-bis(cyclohexylamine) (also named bis(p-aminocyclohexyl-methane) (PACM), 1,4-diaminocyclohexane (1,4-DACH), and 1,2-diaminocyclohexane (1,2-DACH).

Optionally, one or more polyfunctional chain extending and crosslinking agents can be used to crosslink the dispersed prepolymer to increase the molecular weight of the final polyurethane contained in the aqueous dispersion and improve the physical properties of the film and coating formed from the polyurethane. Polyfunctional amines (compounds having more than 2 primary or secondary amine groups per molecule) may be used as crosslinkers in the present invention. The average functionality of the amine, i.e., the number of amine nitrogens per molecule, should be between from about 2.2 to 6.0, or between from about 2.2 to 4, or between from about 2.2 to 3. The desired functionalities can be obtained by using mixtures of polyamines. For example, a functionality of 2.5 can be achieved by using equimolar mixtures of diamines and triamines. A functionality of 3.0 can be achieved either by using
(1) triamines,
(2) equimolar mixtures of diamines and tetramines,
(3) mixtures of (1) and (2), or
(4) any other suitable mixtures useful as chain extending and crosslinking agents will be readily apparent to those of ordinary skill in the art.

Suitable polyamines useful as chain extending and cross-linking agents can be hydrocarbon polyamines containing more than 2 but less than 6 amine groups which have isocyanate-reactive hydrogens, e.g., primary or secondary amine groups. The polyamines are generally aromatic, aliphatic or alicyclic amines and contain between about 1 to 30 carbon atoms, or about 2 to 15 carbon atoms, or about 2 to 10 carbon atoms. These polyamines may contain additional substituents provided that they are not as reactive with isocyanate groups as the primary or secondary amines. Examples of polyamines for use in the present invention diethylene triamine, triethylene tetramine, tetraethylene pentamine, pentaethylene hexamine, N,N,N-tris-(2-aminoethyl)amine, N-(2-piperazinoethyl)ethylene diamine, N,N,N'-tris-(2-aminoethyl)ethylene diamine, N—[N-(2-aminoethyl)-2-aminoethyl]-N'-(2-aminoethyl)-piperazine, N-(2-aminoethyl)-N'-(2-piperazinoethyl)-ethylene diamine, N,N-bis-(2-aminoethyl)-N-(2-piperazinoethyl)-amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylenepentamine, tripropylenetetramine, N,N-bis-(6-aminohexyl)amine, N,N'-bis-(3-aminopropyl)-ethylene diamine and 2,4-bis-(4'-aminobenzyl)-aniline. Some polyamine crosslinkers are diethylene triamine, triethylene tetramine, tetraethylene pentamine and pentaethylene hexamine.

The total amount of chain extending agents including both difunctional amines (diamines) and polyfunctional amines (polyamines) to be used in accordance with the present invention is dependent upon the number of terminal isocyanate groups in the prepolymer. Generally, the ratio of terminal isocyanate groups of the prepolymer to the amino hydrogens of the difunctional/polyfunctional amine is between from about 1.0:0.5 to 1.0:1.2, or between from about 1.0:0.6 to 1.0:1.1, or from about 1.0:0.65 to 1.0:1.1, or from about 1.0:0.75 to 1.0:1.1, or from about 1.0:0.80 to 1.0:1.1, or from about 1.0:0.80 to 1.0:1.0, or from about 1.0:0.85 to 1.0:1.0 on an equivalent basis. Lesser amounts of difunctional/polyfunctional amine will allow for too much undesired reaction of the isocyanate groups with water, while an undue excess may lead to products with low molecular weight and less than the desired amount of cross-linking. For the purposes of these ratios a primary amino group is considered to have one amino hydrogen. For example, ethylene diamine has two eqivalents of amino hydrogens and diethylene triamine has three equivalents.

The chain extension reaction between the dispersed prepolymer and the chain extending agents for example difunctional/polyfunctional amine is conducted at temperatures from about 20 to 90° C., or from about 30 to 85° C., or from about 50 to 80° C. The reaction conditions are normally maintained until the isocyanate groups are substantially completely reacted. In order to reduce the presence of localized concentration gradients, the diamine(s) and/or other polyamine(s) may be added in increments to the dispersed prepolymer which is normally agitated to ensure complete mixing of the polyamine(s) throughout the aqueous medium. The polyamine(s) may be added to the aqueous medium in its pure form or it may be dissolved or dispersed in water prior to adding it to the dispersion.

The polyurethane dispersion is a substantially solvent-free or solvent-free, stable, aqueous dispersion of colloidal-sized particles of polyurethane polymer. The term colloidal size refers to molecules or polymolecular particles dispersed in a medium wherein the majority (or greater than 80% or greater than 90% of the particles have at least in one direction a dimension roughly between 1 nanometers and 2 microns, or about 1 nanometers to about 1.5 microns, or about 10 nanometers to about 1.0 micron. The small particle size enhances the stability of the dispersed particles. Specifically, when the polyurethane polymer of the dispersion is used as adhesive in electronic devices, the small and uniform particle size is very important, given the small feature size in the sophisticated electronic devices. Large particles, for example, larger than 2 microns in size, can potentially lead to defects that cause improper working of the device. These defects are characterized by the existence of electrical shorts or visual defects in the case of electronic display applications. The defects are usually areas in which the device does not display an appropriate image because of improper electrical contact caused by the existence of larger particles.

The aqueous polyurethane dispersions disclosed herein may comprise water and from about 20 to about 60 weight percent, typically from about 30 to about 50, or about 30 to about 40, or about 34 to 40 weight percent solids wherein the solids comprises a polyurethane polymer. The aqueous polyurethane dispersions may be further diluted to any proportion.

The polyurethane polymer contained within the aqueous polyurethane dispersion has a theoretical free isocyanate functionality of approximately zero, and a weight average molecular weight ranging from 9,500 to 250,000, or 12,000 to 200,000, or 15,000 to 150,000, or 20,000 to 120,000, or 20,000 to 100,000, or 20,000 to 80,000, or 20,000 to 40,000, or 40,000 to 60,000, or 40,000 to 80,000.

The polyurethane polymer when used as adhesive requires optimal adhesive strength and cohesive strength. The adhesive strength is related to the material's ability to bind to the substrate surface, and the cohesive strength is defined as the material's ability to separated from its own cohesive forces. The adhesive strength is mainly controlled by the composition of the adhesive with relation to the substrate, while the cohesive strength is related to the composition and the molecular weight. While higher molecular weight is desirable for cohesive strength, too high molecular weight results in undesirable high crossover temperature as defined below. Thus it is desirable to have a polyurethane polymer with optimal molecular weight range to achieve the unique bond strength and lamination quality.

The glass transition temperature, Tg, of the polyurethane contained in the dispersion may range from about −60° C. to about 10° C., as determined by Differential Scanning calorimetry (DSC), and the film dried from the polyurethane dispersions is substantially free of crystallinity as detected by DSC. The use of non-crystalline polymer as adhesive in electronic devices where the ionic conductivity of the adhesive material is necessary for proper device operation is critical to maintaining consistent device performance as a function of environment cycling. Because the degree of crystallinity in crystalline polymers is affected by the exposure to different environmental conditions such as temperature and humidity. Different environment can bring about changes in the degree of crystallinity of the polymer. For ionically conductive polymers, it is only the amorphous regions of the polymer film that contribute to the ionic conductivity, not the crystalline regions. Polymers that crystallize and can undergo changes in crystallinity upon environmental cycling would negatively affect the ionic conductivity of the polymer and thus the electronic device performance. Therefore, it is desirable to have polymeric adhesive free of crystallinity to maintain consistent device performance.

The crossover temperature, Tc, of the polyurethane contained in the dispersion may range from about 35° C. to about 150° C., or about 40° C. to about 140° C., or about 40° C. to about 120° C., or about 40° C. to about 110° C., or about 40° C. to about 100° C., or about 45° C. to 100° C., or about 45° C. to 95° C. The crossover temperature is defined as the temperature at which the Loss modulus (liquid like behavior) becomes dominant over Storage modulus (elestic behavior) as determined by Dynamic Mechanical Analysis (DMA). The crossover temperature is important when the polyurethane contained in the dispersion is used as lamination adhesive. A too high crossover temperature would require excessive temperature or pressure to enable the adhesive to flow well enough to provide adequate contact, and such excessive condition would often result in damage to the electronic components or other components in which the adhesive is used. If the crossover temperature is too low, an adhesive would be too liquid-like even at room temperature. The crossover temperature is determined by the polyurethane composition. In general for similar chemical composition, higher molecular weight and higher acid number induces higher crossover temperature.

The viscosity of the aqueous polyurethane dispersion may range from about 5 to about 4,000 centipoise (cps), or about 10 to about 3,000 cps, or about 20 to about 2,000 cps, or about 20 to about 1,800 cps, or about 20 to about 1,500 cps at room temperature. The dispersions may be optically opaque to transparent. The aqueous polyurethane dispersion is stable, storable, and transportable, and will remain stable in storage and fully dispersed within the aqueous media for extended periods of time of at least 3 months.

The substantially solvent-free or solvent-free aqueous polyurethane dispersions have a pH of 6.0 to 10.0, or 6.5 to 9.5, or 6.8 to 9.2.

Polyurethane polymer contained within the substantially solvent-free or solvent-free aqueous dispersion having different properties may be obtained according to the chemical composition selected and to the urethane group content. Thus, it is possible to obtain soft tacky compositions, and thermoplastic and elastomeric products having a variety of different hardnesses. The hydrophilicity of the products may also vary within certain limits.

The polyurethane polymer contained within the substantially solvent-free or solvent-free aqueous polyurethane dispersion of the present invention when dried as a film has a base volume resistivity that ranges from $1 \times 10^8$ to $1 \times 10^{11}$ ohm/cm. The volume resistivity can be adjusted by the chemical compositions of the polymer. For example, increasing the acid number in the composition increases the volume resistivity of the film. In certain embodiments, the base volume resistivity can be adjusted within the range or outside of the aforementioned range by adding an ionic additive such as an inorganic salt, organic salt, or combination thereof to the aqueous polyurethane dispersion. In these embodiments, the amount of ionic additive that is added to the aqueous polyurethane dispersion may range from about 0.001 to about 20 percent, or about 0.01 to about 10 percent, or about 0.01 to about 1 percent based upon the weight of solids contained therein. The ionic additive may be added to the aqueous polyurethane dispersion neat or may be dissolved in an aqueous solution, non-aqueous solution, or a combination thereof. The ionic additive may be dispersed within the aqueous polyurethane dispersion by agitation, i.e., sonication, mechanical mixing, etc. Exemplary ionic additives include lithium salts such as $LiCF_3SOF_3$, $LiClO_4$, $LiPF_6$, $LiBF_4$, $LiAsF_6$, and $LiN(CF_3SO_2)_3$) organic salt such as t-butylammonium hexafluorophospahte, ionic liquid such as 1-butyl-2-methyl imidazolium hexafluorophate, 1-n-butyl-3-methylimidazolium dicyanoamide, and 1-ethyl-3-methylimidazolium thiocyanate.

The substantially solvent-free or solvent-free aqueous polyurethane dispersions may be blended with non-polyurethane based polymer dispersions selected from the group consisting of water-based acrylics, vinyl/acrylics, styrene/acrylics, vinyl acetates, vinyl-acetate/ethylene copolymers and mixtures thereof. The addition of known, chemically nonfixed emulsifiers is also possible but not essential. Also, fillers, plasticizers, pigments, carbon black and silica sols may be incorporated into the dispersions. The formulations generally have a weight ratio of polyurethaneurea polymer to non-polyurethane polymer in a range from about 9:1 to about 1:9.

Optionally, small amounts of water dispersible polyfunctional crosslinking agents can be added to the polyurethane dispersions prior to formulating the final product in which the polyurethane dispersion is to be used or just prior to their particular use as an adhesive or the like. Crosslinking agents can be selected from the group consisting of isocyanates, aziridines, epoxies, carbodiimides and mixtures thereof. Some useful crosslinking agents include polyfunctional aziridines, carbodiimides and epoxies. The crosslinking agents are present in a range from about 0.1 percent by weight to about 20 percent by weight, or from about 0.3 percent by weight to about 7 percent by weight, based on 100 parts total solids. It is believed that when crosslinking agents are added to the adhesive composition, an interpenetrating or interconnected network is formed. The resulting networks enhance heat, moisture and solvent resistance properties.

The substantially solvent-free aqueous polyurethane dispersions are suitable for coating and impregnating woven and nonwoven textiles, leather, paper, wood, metals, ceramics, stone, concrete, bitumen, hard fibers, straw, glass porcelain, plastics of a variety of different types, glass fibers for antistatic and crease-resistant finishing; as binders for nonwovens, adhesives, adhesion promoters, laminating agents, hydrophobizing agents, plasticizers; as binders, for example, for cork powder or sawdust, glass fibers, asbestos, paper-like materials, plastics or rubber waste, ceramic materials; as auxiliaries in textile printing and in the paper industry; as additives to polymers as sizing agents, for example, for glass fibers; and for finishing leather.

The substantially solvent-free aqueous polyurethane dispersion of the present invention can be used as laminating adhesive or binder materials for coatings. It is typically employed as laminating adhesives in which films of such materials as metal foils, e.g., aluminum, and polymeric materials, e.g., polyesters and low density polyethylene, are laminated to one another and to each other. Once dispersed within a dispersing media, the composition can be modified with other standard ingredients typically employed in formulating adhesives. For example, the dispersions can be combined with other typical ingredients used in adhesive compositions such as curing agents, plasticizers, crosslinking agents, pigments, thickeners, surface active compounds, defoamers, fillers, anti-settling agents, etc to provide an adhesive composition. The adhesives may then be applied to a substrate via dipping, knife-coating, pouring, spraying, brushing, and other known methods. After the adhesive composition has been applied to the substrate, coated substrates are typically dried at room temperature or at one or more temperatures up to about 150° C. and subsequently conditioned under humidity conditions for a certain period of time. When used as lamination adhesive for electronic devices, it may be preferable that some, if not all, of the reactants have low impurity levels, i.e., contain less than 50 ppm of metal-containing impurities. In these embodiments, the reactants used within the reaction mixture should comply with the standard purity requirements set by the electronics industry. For some embodiments, the alkali metal impurity specifications for integrated circuit applications typically set the allowable impurity levels to approximately 20 parts per billion maximum for each type of alkali metal and less than 50 ppb total.

Representative embodiments of the present invention will be described in more detail with reference to the following examples that illustrate the principles and practice of the present invention, but it should be understood that the present invention is not deemed to be limited thereto.

EXAMPLES

In the following examples, unless stated otherwise, weight average molecular weight ($M_w$) was obtained by size exclusion chromatography (GPC) on a Waters Alliance 2690 Separator System connected to 2410 RI and 2996 PDA detectors using PSS GPC columns: Gram 10μ, 3000 Å, 8×300 mm column, GRAM 10μ, 100 Å, 8×300 mm column and Gram 10μ, Guard, 8×50 mm column. HPLC grade DMF containing 0.05 M LiBr was employed as eluent. Samples of the polyurethane dispersions for GPC analysis were prepared in the following manner. A 25 to 45 mg amount of the aqueous polyurethane dispersion having a solid weight of approximately 35% was charged into 20 mL sample vials. A 10 mL amount of a 0.05 M LiBr/DMF stock solution, which was prepared under agitation with magnetic stir bars and allowed to obtain complete dissolution, was also charged into the 20 mL vials using an electronic pipette to provide a 0.15% to 0.2% weight/volume concentration solution. The solution was then mixed for 10 hours or overnight using a slow stirring rate (i.e., vortex-free). After mixing, a 1.6+/−0.2 mL of solution from the 20 mL vial was transferred into the sample carousel that was then analyzed via GPC at a temperature of 40° C. and a flow rate of 1 mL/min to determine the molecular weight using poly(methyl methacrylate) as a standard.

Viscosity of the aqueous polyurethane dispersions was measured at 25° C. using a Brookfield DV-II viscometer at low shear with spindle #27 and guard, and the viscosity of the prepolymer was measured at 80° C. using the small sample adapter with spindle #21. The viscosmeter was equipped with a temperature controller and all readings were taken at near 50% torque.

Orion model 520 sure flow cross combination electrode was used for pH measurements. Calibrations were performed each day using 3 points with Fisher standard buffers 4, 7, and 10.

Particle size measurements were performed suing a Hiriba LA-910 instrument and by Capillary Hydrodynamic Fractionation (CHDF) as per standard analytical procedures.

DSC analysis was performed using TA Instruments model 2920 differential scanning calorimeter using a heating rate of 20° C./min and a helium purge gas having a flow rate of 25 cubic centimeter (ccm) using a crimped aluminum pan.

Titrations performed for acid number and NCO value (weight percent free isocyanate groups) were performed using a Radiometer titrator equipped with a SAM90 sample station and a VIT90 video tritrator. NCO titrations were performed by dissolving 0.5 grams to 1 gram of prepolymer in 25 mL of toluene that contained (50 grams of dibutyl amine for every 4 L of solvent). The resultant solution was stirred at 80° C. for 15 min and then the excess amine was titrated using 0.1 N HCl. Acid number titrations were performed using a known wt. of sample dissolved in 75 ml of toluene and 75 ml of anhydrous methanol by stirring at 50-60° C. for 3 min. The sample was allowed to cool to room temperature. This solution was then titrated with 0.02 N methanolic KOH. Acidity was then reported as milli-equivalent of KOH per gram of sample.

The crossover temperature (Tc) was measured by dynamic mechanical analysis (DMA). A small quantity of polyurethane dispersion was poured at the top of clean heavy gauge polyethylene film and a 60 mil (1 mil=0.001 inch=0.0254 millimeter) drawdown bar was used to draw a film, then a 40 mil drawdown bar was run over the 60 mil film. The polyurethane film was allowed to dry for a minimum of 6 hours at approximately 72° F., 50% relative humidity.

After air drying, the polyurethane film on the polyethylene substrate was placed in a vacuum oven at 50° C. and 30 mmHg vacuum for a minimum of 2 hours. The film was removed from the vacuum oven and cooled down to room temperature. The polyurethane film was peeled from the polyethylene substrate and is folded over 3 times. Any air bubbles are punctured with a dissecting needle and the air is rolled out. Three 8 mm discs were cut from the folded polyurethane film and stacked together. The stack should be approximately 2-3 millimeter in thickness A TA Instruments RDA-III controlled strain Rheometer was used for testing. 8 mm parallel plates were zeroed at −20° C., and then equilibrated at 50° C. The polyurethane disc stack was placed between the plates. The disc was compressed to approximately 1.3 mm using normal force and the excess of the polyurethane was trimmed off using a scalpel. The test temperature range was −20° C. to 300° C. and frequency was 1 hertz.

Volume Resistivity was measured using a Eumetrics Dielectometer manufactured by Micromet Co. at a frequency measurement of 1 hertz and the averaged data results over a 30-minute time period (or 130 data points). Volume resistivity of some of exemplary samples are listed in Table II.

The reagents used in the examples are listed in Table I.

TABLE I

Reagents used in examples.

| Trade name | designation | abbreviation | manufacturer |
|---|---|---|---|
| Desmodur ® W | 4,4-diisocyanatodicyclohexylmethane | Des W, H12MDI | Bayer |
| Carbowax ™ MPEG350 | Poly(ethylene glycol) monomethyl ether Mn~350 | MPEG350 | Dow Chemical |
| Carbowax ™ MPEG550 | Poly(ethylene glycol) monomethyl ether Mn~550 | MPEG550 | Dow Chemical |
| | Poly(ethylene glycol) monomethyl ether Mn~750 | MPEG750 | Aldrich Chemical |
| | Poly(ethylene glycol) monomethyl ether Mn~1000 | MPEG1000 | Aldrich Chemical |
| | 2,2-Dimethylol propanoic acid | DMPA | Aldrich Chemical |
| Dowanol ™ TPM | Tripropyleneglycol Monomethyl Ether | Dowanol TPM | Aldrich Chemical |
| Tomadol ® 23-3 | Ethoxylated alchohol | Tomadol 23-3 | Air Products |
| Voranol ™ 220-110 | Poly(propylene oxide) diol, Mn~1000 | PPO1000 | Dow Chemical |
| Voranol ™ 220-056 | Poly(propylene oxide) diol, Mn~2000 | PPO2000 | Dow Chemical |
| Oxymer ® M112 | Polycarbonate diol, Mn~1000 | Oxymer1000 | Perstorp Group |
| Desmophen ® S 105-110 | Poly(neopentyl glycol adipate) diol, Mn~1000 | Desmophen1000 | Bayer Materials Science |
| Terathane ® | Poly(tetramethylene glycol) diol, Mn~1000 | Terathane1000 | Invista |
| CAPA ™ 7203 | Poly(caprolactone-block-carbonate) diol, Mn~2000 | CAPA 7203 | Perstorp Group |
| | Glycolic acid | GA | Aldrich Chemical |
| | N,N'-dibutylamine | DBA | Aldrich Chemical |
| | morpholine | morpholine | Aldrich Chemical |
| | triethylamine | TEA | Aldrich Chemical |
| | Triethanol amine | TEtOHA | Aldrich Chemical |
| | Hexamethylene diamine | HMDA | Aldrich Chemical |
| | Isophorone diamine | IPDA | Aldrich Chemical |
| | 1,3-bis(amino-methyl)cyclohexane | BAC | Aldrich Chemical |
| | cis/trans 1,4-diaminocyclohexane | cis/trans 1,4-DACH | DuPont |
| | cis/trans 1,2-diaminocyclohexane | cis/trans 1,2-DACH | Aldrich Chemical |
| | trans 1,4-diaminocyclohexane | trans 1,4-DACH | Aldrich Chemical |
| | Neopentyl diamine | NPDA | Aldrich Chemical |
| | Diethylene triamine | DETA | Aldrich Chemical |

All the chain extending agents were prepared as 70% aqueous solutions unless otherwise specified.

Preparation of Aqueous Polyurethane Dispersions

All the dispersions in the following examples were produced in the same process as described in Example 1, unless otherwise specified.

Example 1

| component | abbreviation | grams |
|---|---|---|
| diisocyante | Des W | 162.51 |
| Polyol | PRO1000 | 220.93 |
| Ionic component | DMPA | 16.62 |
| Chain terminating agent | MPEG550 | 74.95 |
| Neutralizing agent | TEtOHA | 7.78 |
| Chain extending agent | HMDA | 12.26 |
| D.I. water | water | 359.36 |

A 1 L 3-neck round-bottomed flask equipped with a mechanical stirrer and nitrogen inlet was charged with diisocyanate Des W, the difunctional polyol PPO1000, ionic component DMPA, and chain terminating agent MPEG550 at room temperature. The contents of the reactor were stirred at 200 rpm and the material was heated to 95° C. for approximately 3 hours. A sample was taken out to measure the free isocyanate groups (NCO content) in the reactor to ensure complete reaction of hydroxyl groups with isocyanate groups. Once the NCO value reached theoretical value, the contents of the reactor were then cooled to 85° C.

To a 1 L jacketed glass reactor equipped with an external heating bath and a pitch blade impeller was added D.I. water and neutralizing agent TEtOHA. 200 grams of the prepolymer was added to the D.I. water with agitation at 200 to 300 rpm for over 10 minutes to provide a translucent dispersion. Care was taken during the dispersion step to maintain a temperature below 40° C. A 70% aqueous solution containing the chain extending agent HMDA was then added dropwise to the dispersion, and stirred for 15 minutes. The dispersion was then heated to 50° C. for 1 hour, after which it was cooled to 35° C. and collected.

Various properties of the aqueous polyurethane dispersions were measured, calculated or observed and the results are provided in Table III. The dispersion viscosity was usually measured within 48 hours after preparation.

Example 2

The same as Example 1, except 5.28 g of TEA was used as neutralizing agent instead of TEtOHA.

Example 3

375 grams of prepolymer prepared and 325 grams of the prepolymer were dispersed in water based on the same raw material ratio as Example 1. The procedure was the same as Example 1 except MPEG 550 was added after the rest of the reagents of prepolymer were reacted for 2 hours at 95° C.

Example 4

375 grams of prepolymer were prepared and 300 grams of the prepolymer were dispersed in water based on the same raw material ratio as Example 1. The procedure was the same as Example 1 except DMPA was added after Des W and PPO1000 were reacted at 70° C. for 30 minutes, and then the temperature was elevated to 95° C. and maintained for 2 hours, then MPEG 550 was added.

Example 5

375 grams of prepolymer were prepared and 300 grams of the prepolymer were dispersed in water based on the same raw material ratio as Example 1 except 14.07 grams of HMDA was used as the chain extending agent.

Example 6

| component | abbreviation | grams |
| --- | --- | --- |
| diisocyante | Des W | 128.29 |
| Polyol 1 | PPO1000 | 174.42 |
| Ionic component | DMPA | 13.12 |
| Chain terminating agent | MPEG550 | 59.17 |
| Neutralizing agent | TEtOHA | 9.34 |
| Chain extending agent | HMDA | 18.40 |
| D.I. water | water | 541.37 |

300 grams of prepolymer were dispersed in water.

Example 7

| component | abbreviation | grams |
| --- | --- | --- |
| diisocyante | Des W | 125.64 |
| Polyol 1 | PPO1000 | 170.81 |
| Ionic component | DMPA | 12.85 |
| Chain terminating agent | MPEG550 | 57.95 |
| Neutralizing agent | TEA | 7.75 |
| Chain extending agent | HMDA | 18.40 |
| D.I. water | water | 525.55 |

In this example, the neutralizing agent TEA was added to the prepolymer instead of into water. Prepolymer was prepared in the same process as Example 1. After NCO reached theoretical value, the reactor temperature was decreased to 70-75° C., and TEA was added via a submerged syringe needle. After stirring at 70-75° C. for 15-30 minutes, 300 grams of prepolymer were dispersed into water.

Example 8

375 grams of prepolymer were prepared and 300 grams of the prepolymer were dispersed in water based on the same raw material ratio as Example 1 except 14.01 grams of TEtOHA was used as the neutralizing agent.

Example 9

| component | abbreviation | grams |
| --- | --- | --- |
| diisocyante | Des W | 121.71 |
| Polyol | PRO1000 | 165.47 |
| Ionic component | DMPA | 12.45 |
| Chain terminating agent 1 | MPEG350 | 10.08 |
| Chain terminating agent 2 | MPEG550 | 40.30 |
| Neutralizing agent | TEtOHA | 11.87 |
| Chain extending agent | HMDA | 18.70 |
| D.I. water | water | 539.13 |

300 grams of prepolymer were dispersed in water.

Example 10

| component | abbreviation | grams |
| --- | --- | --- |
| diisocyante | Des W | 122.57 |
| Polyol | PPO1000 | 166.64 |
| Ionic component | DMPA | 12.53 |
| Chain terminating agent 1 | MPEG350 | 14.48 |
| Chain terminating agent 2 | MPEG550 | 33.78 |
| Neutralizing agent | TEtOHA | 11.95 |
| Chain extending agent | HMDA | 18.85 |
| D.I. water | water | 539.19 |

300 grams of prepolymer were dispersed in water.

Example 11

| component | abbreviation | grams |
| --- | --- | --- |
| diisocyante | Des W | 119.74 |
| Polyol | PPO1000 | 162.79 |
| Ionic component | DMPA | 12.24 |
| Chain terminating agent | MPEG550 | 55.23 |
| Neutralizing agent | TEA | 7.92 |
| Chain extending agent | IPDA | 26.96 |
| D.I. water | water | 550.88 |

300 grams of prepolymer were dispersed in water.

Example 12

| component | abbreviation | grams |
| --- | --- | --- |
| diisocyante | Des W | 119.74 |
| Polyol | PPO1000 | 162.79 |
| Ionic component | DMPA | 12.24 |
| Chain terminating agent | MPEG550 | 55.23 |
| Neutralizing agent | TEA | 7.92 |
| Chain extending agent 1 | HMDA | 12.93 |
| Chain extending agent 2 | DETA | 3.23 |
| D.I. water | water | 540.68 |

300 grams of prepolymer were dispersed in water.

Example 13

The same amount of prepolymer as Example 12 was prepared and the same amount of prepolymer was dispersed in water except 11.67 grams of TEtOHA were used as neutralizing agent instead of TEA, and 15.50 grams of HMDA and 1.72 grams of DETA were used as chain extending agents.

Example 14

| component | abbreviation | grams |
|---|---|---|
| diisocyante | Des W | 133.62 |
| Polyol | PPO1000 | 165.53 |
| Ionic component | DMPA | 12.81 |
| Chain terminating agent | MPEG550 | 63.03 |
| Neutralizing agent | TEtOHA | 11.40 |
| Chain extending agent | HMDA | 21.57 |
| D.I. water | water | 542.31 |

300 grams of prepolymer were dispersed in water.

Example 15

| component | abbreviation | grams |
|---|---|---|
| diisocyante | Des W | 128.29 |
| Polyol 1 | PPO1000 | 139.53 |
| Polyol 2 | Oxymer1000 | 34.88 |
| Ionic component | DMPA | 13.12 |
| Chain terminating agent | MPEG550 | 59.17 |
| Neutralizing agent | TEtOHA | 11.67 |
| Chain extending agent | HMDA | 18.40 |
| D.I. water | water | 563.87 |

300 grams of prepolymer were dispersed in water.

Example 16

| component | abbreviation | grams |
|---|---|---|
| diisocyante | Des W | 130.01 |
| Polyol 1 | PRO1000 | 107.54 |
| Polyol 2 | Oxymer1000 | 46.1 |
| Ionic component | DMPA | 16.40 |
| Chain terminating agent | MPEG550 | 59.96 |
| Neutralizing agent | TEA | 10.31 |
| Chain extending agent | IPDA | 28.43 |
| D.I. water | water | 575.27 |

300 grams of prepolymer were dispersed in water.

Example 17

| component | abbreviation | grams |
|---|---|---|
| diisocyante | Des W | 243.77 |
| Polyol 1 | PRO1000 | 172.83 |
| Polyol 2 | Oxymer1000 | 115.22 |
| Ionic component | DMPA | 30.74 |
| Chain terminating agent | MPEG550 | 112.43 |
| Neutralizing agent | TEA | 9.45 |
| Chain extending agent | cis/trans 1,4-DACH | 17.47 |
| D.I. water | water | 518.73 |

275 grams of prepolymer were dispersed in water.

Example 18

The same amount of prepolymer as Example 17 was prepared and the same amount of prepolymer was dispersed in water except 21.77 grams of BAC was used as chain extending agent instead of cis/trans-1,4-DACH.

Example 19

375 grams of prepolymer were prepared and 300 grams of the prepolymer were dispersed in water based on the same raw material ratio as Example 17 except 28.43 grams of IPDA were used as chain extending agent instead of cis/trans-1,4-DACH.

Example 20

| component | abbreviation | grams |
|---|---|---|
| diisocyante | Des W | 135.43 |
| Polyol 1 | PPO1000 | 96.02 |
| Polyol 2 | Oxymer1000 | 64.01 |
| Ionic component | DMPA | 17.08 |
| Chain terminating agent | MPEG550 | 62.46 |
| Neutralizing agent | TEA | 10.31 |
| Chain extending agent 1 | IPDA | 17.58 |
| Chain extending agent 2 | DETA | 4.39 |
| D.I. water | water | 568.81 |

300 grams of prepolymer were dispersed in water.

Example 21

| component | abbreviation | grams |
|---|---|---|
| diisocyante | Des W | 128.29 |
| Polyol 1 | PPO1000 | 139.53 |
| Polyol 2 | Desmophen 1000 | 34.88 |
| Ionic component | DMPA | 13.12 |
| Chain terminating agent | MPEG550 | 59.17 |
| Neutralizing agent | TEtOHA | 11.67 |
| Chain extending agent | HMDA | 18.40 |
| D.I. water | water | 563.87 |

300 grams of prepolymer were dispersed in water.

Example 22

| component | abbreviation | grams |
|---|---|---|
| diisocyante | Des W | 234.75 |
| Polyol 1 | PPO1000 | 138.69 |
| Polyol 2 | Desmophen1000 | 138.69 |
| Ionic component | DMPA | 29.60 |
| Chain terminating agent | MPEG550 | 108.27 |
| Neutralizing agent | TEA | 9.45 |
| Chain extending agent | cis/trans 1,2-DACH | 17.47 |
| D.I. water | water | 518.73 |

275 grams of prepolymer were dispersed in water;

Example 23

The same amount of prepolymer as Example 22 was prepared and the same amount of prepolymer was dispersed in water except 24, 45 grams (50% aqueous solution) of trans 1,4-DACH were used as chain extending agent instead of cis/trans 1,2-DACH.

Example 24

The same amount of prepolymer as Example 22 was prepared and the same amount of prepolymer was dispersed in water except 17.48 grams of cis/trans 1,4-DACH were used as chain extending agent instead of cis/trans 1,2-DACH.

Example 25

The same amount of prepolymer as Example 22 was prepared and the same amount of prepolymer was dispersed in water except 15.64 grams of NPDA were used as chain extending agent instead of cis/trans 1,2-DACH.

Example 26

| component | abbreviation | grams |
| --- | --- | --- |
| diisocyante | Des W | 225.72 |
| Polyol 1 | PPO1000 | 133.36 |
| Polyol 2 | Desmophen1000 | 133.36 |
| Ionic component | DMPA | 28.47 |
| Chain terminating agent | MPEG550 | 104.10 |
| Neutralizing agent | TEA | 8.59 |
| Chain extending agent | IPDA | 23.70 |
| D.I. water | water | 479.39 |

250 grams of prepolymer were dispersed in water;

Example 27

The same amount of prepolymer as Example 26 was prepared and the same amount of prepolymer was dispersed in water except 19.79 grams of BAC were used as chain extending agent instead of IPDA.

Example 28

| component | abbreviation | grams |
| --- | --- | --- |
| diisocyante | Des W | 135.43 |
| Polyol 1 | PPO1000 | 80.0 |
| Polyol 2 | Desmophen1000 | 80.0 |
| Ionic component | DMPA | 17.08 |
| Chain terminating agent | MPEG550 | 62.46 |
| Neutralizing agent | TEA | 10.31 |
| Chain extending agent 1 | IPDA | 17.58 |
| Chain extending agent 2 | DETA | 4.39 |
| D.I. water | water | 568.81 |

300 grams of prepolymer were dispersed in water.

Example 29

The same amount of prepolymer as Example 28 was prepared and the same amount of prepolymer was dispersed in water except 19.40 grams of NMDA were used as chain extending agent instead of IPDA/DETA.

Example 30

The same amount of prepolymer as Example 28 was prepared and the same amount of prepolymer was dispersed in water except 13.82 grams of IPDA and 5.92 grams of DETA were used as chain extending agents.

Example 31

| component | abbreviation | grams |
| --- | --- | --- |
| diisocyante | Des W | 123.16 |
| Polyol 1 | PPO1000 | 83.72 |
| Polyol 2 | Desmophen1000 | 83.72 |
| Ionic component | DMPA | 12.59 |
| Chain terminating agent | MPEG550 | 56.80 |
| Neutralizing agent | TEA | 7.92 |
| Chain extending agent | IPDA | 22.37 |
| D.I. water | water | 571.60 |

300 grams of prepolymer were dispersed in water.

Example 32

| component | abbreviation | grams |
| --- | --- | --- |
| diisocyante | Des W | 243.77 |
| Polyol 1 | PPO1000 | 172.83 |
| Polyol 2 | Oxymer1000 | 115.22 |
| Ionic component | DMPA | 30.74 |
| Chain terminating agent | MPEG550 | 112.43 |
| Neutralizing agent | TEA | 9.45 |
| Chain extending agent | 1,2-DACH | 17.47 |
| D.I. water | water | 518.73 |

TEA was added to water and 275 grams of prepolymer were dispersed in water/TEA.

Example 33

| component | abbreviation | grams |
| --- | --- | --- |
| diisocyante | Des W | 125.02 |
| Polyol | PPO1000 | 196.18 |
| Ionic component | DMPA | 12.78 |
| Chain terminating agent 1 | MPEG550 | 28.83 |
| Chain terminating agent 2 | GA | 3.99 |
| Neutralizing agent | TEA | 8.20 |
| Chain extending agent | HMDA | 15.32 |
| D.I. water | water | 529.59 |

After the prepolymer is formed, and NCO value reached theoretical value, the prepolymer was cooled to 70-75° C., a portion of neutralizing agents TEA 5 grams were added by a submerged syringe needle, and reaction mixture was stirred at 70-75° C. for 15-30 minutes. The remaining 3.2 grams of TEA was added to water before prepolymer was dispersed. 300 grams of prepolymer was dispersed in TEA/water.

Example 34

| component | abbreviation | grams |
| --- | --- | --- |
| diisocyante | Des W | 139.45 |
| Polyol | PPO1000 | 172.52 |
| Ionic component | DMPA | 13.35 |
| Chain terminating agent 1 | MPEG350 | 41.80 |
| Neutralizing agent | TEA | 8.06 |
| Chain extending agent | HMDA | 22.98 |
| D.I. water | water | 537.54 |

TEA was added to prepolymer via a submerged syringe needle. The neutralized prepolymer 300 grams were dispersed in water.

Example 35

| component | abbreviation | grams |
| --- | --- | --- |
| diisocyante | Des W | 180.28 |
| Polyol | PPO1000 | 223.33 |
| Ionic component | DMPA | 17.28 |
| Chain terminating agent 1 | MPEG350 | 54.11 |
| Neutralizing agent | TEA | 5.49 |
| Chain extending agent | HMDA | 15.12 |
| D.I. water | water | 305.85 |

200 grams of prepolymer were dispersed in water. TEA was added to water before prepolymer was dispersed.

Example 36

| component | abbreviation | grams |
| --- | --- | --- |
| diisocyante | Des W | 111.65 |
| Polyol | PRO1000 | 231.99 |
| Ionic component | DMPA | 7.24 |
| Chain terminating agent 1 | MPEG550 | 18.90 |
| Neutralizing agent | TEA | 12.41 |
| Chain extending agent | HMDA | 9.93 |
| D.I. water | water | 516.02 |

TEA was added to prepolymer. 300 grams of neutralized prepolymer were dispersed in water.

Example 37

| component | abbreviation | grams |
| --- | --- | --- |
| diisocyante | Des W | 131.52 |
| Polyol | PPO1000 | 200.52 |
| Ionic component | DMPA | 13.21 |
| Chain terminating agent 1 | MPEG550 | 21.66 |
| Chain terminating agent 2 | GA | 3.00 |
| Chain terminating agent 3 | DBA | 5.09 |
| Neutralizing agent | TEA | 10.46 |
| Chain extending agent | HMDA | 16.45 |
| D.I. water | water | 534.76 |

TEA was added to prepolymer. 305 grams of neutralized prepolymer were dispersed in water.

Example 38

| component | abbreviation | grams |
| --- | --- | --- |
| diisocyante | Des W | 182.97 |
| Polyol | PRO1000 | 332.62 |
| Ionic component | DMPA | 18.25 |
| Chain terminating agent 1 | MPEG550 | 61.87 |
| Chain terminating agent 2 | GA | 4.28 |
| Neutralizing agent | TEA | 12.65 |
| Chain extending agent | HMDA | 17.31 |
| D.I. water | Water | 893.76 |

TEA was added to prepolymer. 510 grams of neutralized prepolymer was dispersed in water.

Example 39

| component | abbreviation | grams |
| --- | --- | --- |
| diisocyante | Des W | 114.36 |
| Polyol | PPO2000 | 207.89 |
| Ionic component | DMPA | 11.45 |
| Chain terminating agent 1 | MPEG550 | 38.67 |
| Chain terminating agent 2 | GA | 2.65 |
| Neutralizing agent | TEA | 6.45 |
| Chain extending agent | NPDA | 8.95 |
| D.I. water | Water | 527.69 |

TEA was added to prepolymer. 305 grams of neutralized prepolymer were dispersed in water.

Example 40

| component | abbreviation | grams |
| --- | --- | --- |
| diisocyante | Des W | 98.98 |
| Polyol | PPO2000 | 233.42 |
| Ionic component | DMPA | 12.73 |
| Chain terminating agent 1 | MPEG550 | 30.50 |
| Chain terminating agent 2 | GA | 1.93 |
| Neutralizing agent | TEA | 12.65 |
| Chain extending agent | HMDA | 14.41 |
| D.I. water | Water | 520.75 |

TEA was added to prepolymer. 306 grams of neutralized prepolymer were dispersed in water.

Example 41

| component | abbreviation | grams |
| --- | --- | --- |
| diisocyante | Des W | 127.36 |
| Polyol | PPO2000 | 217.31 |
| Ionic component | DMPA | 7.37 |
| Chain terminating agent 1 | MPEG550 | 17.99 |
| Chain terminating agent 2 | GA | 4.97 |
| Neutralizing agent | TEA | 12.17 |
| Chain extending agent | HMDA | 18.55 |
| D.I. water | Water | 524.65 |

TEA was added to prepolymer. 300 grams of neutralized prepolymer were dispersed in water.

Example 42

| component | abbreviation | grams |
| --- | --- | --- |
| diisocyante | Des W | 139.69 |
| Polyol | PPO1000 | 196.42 |
| Ionic component | DMPA | 13.71 |
| Chain terminating agent 1 | MPEG550 | 19.73 |
| Chain terminating agent 2 | GA | 5.45 |
| Neutralizing agent | TEA | 11.44 |
| Chain extending agent | HMDA | 20.31 |
| D.I. water | Water | 527.86 |

TEA was added to prepolymer. 304 grams of neutralized prepolymer were dispersed in water.

Example 43

| component | abbreviation | grams |
| --- | --- | --- |
| diisocyante | Des W | 138.74 |
| Polyol | PPO1000 | 153.36 |
| Ionic component | DMPA | 18.92 |
| Chain terminating agent | MPEG550 | 63.99 |
| Neutralizing agent | TEtOHA | 16.83 |
| Chain extending agent | HMDA | 19.91 |
| D.I. water | Water | 535.30 |

TEAtOHA was added to water before prepolymer was dispersed. 300 grams of prepolymer were dispersed in water/TEAtOHA mixture.

Example 44

| component | abbreviation | grams |
| --- | --- | --- |
| diisocyante | Des W | 162.51 |
| Polyol | PPO1000 | 220.93 |
| Ionic component | DMPA | 16.62 |
| Chain terminating agent | MPEG550 | 74.95 |
| Neutralizing agent | TEtOHA | 7.78 |
| Chain extending agent | HMDA | 12.26 |
| D.I. water | water | 359.36 |

TEAtOHA was added to water before prepolymer was dispersed. 200 grams of prepolymer were dispersed in water/TEAtOHA.

Example 45

| component | abbreviation | grams |
| --- | --- | --- |
| diisocyante | Des W | 103.73 |
| Polyol | PPO1000 | 239.78 |
| Ionic component | DMPA | 6.92 |
| Chain terminating agent | MPEG550 | 19.25 |
| Neutralizing agent | TEA | 12.30 |
| Chain extending agent | HMDA | 5.85 |
| D.I. water | water | 512.16 |

TEA was added to prepolymer. 300 grams of neutralized prepolymer were dispersed in water.

Example 46

| component | abbreviation | grams |
| --- | --- | --- |
| diisocyante | Des W | 91.92 |
| Polyol1 | PPO1000 | 84.80 |
| Polyol2 | PPO2000 | 169.60 |
| Ionic component | DMPA | 8.83 |
| Chain terminating agent | MPEG550 | 15.56 |
| Neutralizing agent | TEA | 12.38 |
| Chain extending agent | HMDA | 8.17 |
| D.I. water | water | 514.41 |

TEA was added to prepolymer. 300 grams of neutralized prepolymer were dispersed in water.

Example 47

| component | abbreviation | grams |
| --- | --- | --- |
| diisocyante | Des W | 115.27 |
| Polyol | PPO1000 | 228.80 |
| Ionic component | DMPA | 7.14 |
| Chain terminating agent | MPEG550 | 18.64 |
| Neutralizing agent | TEA | 12.24 |
| Chain extending agent | HMDA | 12.05 |
| D.I. water | water | 518.37 |

TEA was added to prepolymer. 300 grams of neutralized prepolymer were dispersed in water.

Example 48

| component | abbreviation | grams |
| --- | --- | --- |
| diisocyante | Des W | 120.84 |
| Polyol | PRO1000 | 218.93 |
| Ionic component | DMPA | 10.30 |
| Chain terminating agent | MPEG550 | 19.54 |
| Neutralizing agent | TEA | 14.95 |
| Chain extending agent | HMDA | 12.6 |
| D.I. water | water | 513.28 |

TEA was added to prepolymer. 300 grams of neutralized prepolymer were dispersed in water.

Example 49

| component | abbreviation | grams |
| --- | --- | --- |
| diisocyante | Des W | 134.64 |
| Polyol | Terathane1000 | 148.83 |
| Ionic component | DMPA | 18.36 |
| Chain terminating agent | MPEG550 | 19.54 |
| Neutralizing agent | TEA | 11.08 |
| Chain extending agent | HMDA | 19.91 |
| D.I. water | water | 527.52 |

TEA was added to prepolymer. 300 grams of neutralized prepolymer were dispersed in water.

Example 50

| component | abbreviation | grams |
| --- | --- | --- |
| diisocyante | Des W | 126.91 |
| Polyol | Terathane1000 | 215.27 |
| Ionic component | DMPA | 10.81 |
| Chain terminating agent | MPEG350 | 18.62 |
| Neutralizing agent | TEA | 10.83 |
| Chain extending agent | HMDA | 15.17 |
| D.I. water | water | 524.30 |

TEA was added to prepolymer. 303 grams of neutralized prepolymer were dispersed in water.

Example 51

| component | abbreviation | grams |
| --- | --- | --- |
| diisocyante | Des W | 142.59 |
| Polyol | PPO1000 | 175.73 |
| Ionic component | DMPA | 17.01 |
| Chain terminating agent 1 | Dowanol TPM | 24.67 |
| Neutralizing agent | TEtOHA | 15.77 |
| Chain extending agent | HMDA | 21.32 |
| D.I. water | water | 537.70 |

TEtOHA was added to water, and 300 grams of prepolymer were dispersed in water/TEtOHA.

Example 52

| component | abbreviation | grams |
| --- | --- | --- |
| diisocyante | Des W | 115.05 |
| Polyol 1 | PPO2000 | 222.20 |
| Ionic component | DMPA | 17.84 |
| Chain terminating agent | Dowanol TPM | 24.67 |
| Neutralizing agent | TEtOHA | 15.88 |
| Chain extending agent | HMDA | 16.48 |
| D.I. water | water | 533.02 |

TEtOHA was added to water, and 300 grams of prepolymer was dispersed in water/TEtOHA.

Example 53

| component | abbreviation | grams |
| --- | --- | --- |
| diisocyante | Des W | 136.94 |
| Polyol 1 | PRO1000 | 186.16 |
| Ionic component | DMPA | 14.00 |
| Chain terminating agent 1 | Dowanol TPM | 15.2 |
| Chain terminating agent 2 | MPEG550 | 22.7 |
| Neutralizing agent | TEtOHA | 12.46 |
| Chain extending agent | HMDA | 19.66 |
| D.I. water | water | 539.44 |

TEtOHA was added to water, and 300 grams of prepolymer were dispersed in water/TEtOHA.

Example 54

| component | abbreviation | grams |
| --- | --- | --- |
| diisocyante | Des W | 113.10 |
| Polyol 1 | PPO2000 | 212.68 |
| Ionic component | DMPA | 17.93 |
| Chain terminating agent 1 | Dowanol TPM | 12.52 |
| Chain terminating agent 2 | MPEG550 | 18.78 |
| Neutralizing agent | TEtOHA | 15.95 |
| Chain extending agent | HMDA | 16.23 |
| D.I. water | water | 539.44 |

TEtOHA was added to water, and 300 grams of prepolymer were dispersed in water/TEtOHA.

Example 55

| component | abbreviation | grams |
| --- | --- | --- |
| diisocyante | Des W | 132.63 |
| Polyol 1 | PRO1000 | 180.31 |
| Ionic component | DMPA | 13.56 |
| Chain terminating agent 1 | Domadol 23-3 | 17.91 |
| Chain terminating agent 2 | MPEG550 | 30.59 |
| Neutralizing agent | TEtOHA | 9.65 |
| Chain extending agent | HMDA | 19.00 |
| D.I. water | water | 541.62 |

TEtOHA was added to water, and 300 grams of prepolymer was dispersed in water/TEtOHA.

Example 56

| component | abbreviation | grams |
| --- | --- | --- |
| diisocyante | Des W | 139.82 |
| Polyol | PRO1000 | 183.87 |
| Ionic component | DMPA | 19.06 |
| Chain terminating agent | MPEG550 | 32.24 |
| Neutralizing agent | TEtOHA | 16.54 |
| Chain extending agent | HMDA | 24.29 |
| D.I. water | water | 611.32 |

TEtOHA was added to water, and 325 grams of prepolymer were dispersed in water/TEtOHA.

Example 57

| component | abbreviation | grams |
| --- | --- | --- |
| diisocyante | Des W | 133.87 |
| Polyol 1 | PPO1000 | 183.87 |
| Ionic component | DMPA | 31.81 |
| Chain terminating agent | MPEG550 | 17.34 |
| Neutralizing agent | TEA | 10.75 |
| Chain extending agent | IPDA | 28.88 |
| D.I. water | water | 575.27 |

TEA was added to water, and 300 grams of prepolymer was dispersed in water/TEA.

Example 58

| component | abbreviation | grams |
| --- | --- | --- |
| diisocyante | Des W | 98.00 |
| Polyol 2 | CAPA 7203 | 191.76 |
| Ionic component | DMPA | 15.03 |
| Chain terminating agent | MPEG550 | 45.20 |
| Neutralizing agent | TEtOHA | 11.47 |
| Chain extending agent | HMDA | 15.07 |
| D.I. water | water | 536.10 |

TEtOHA was added to water, and 300 grams of prepolymer were dispersed in water/TEtOHA.

Example 59

| component | abbreviation | grams |
|---|---|---|
| diisocyante | Des W | 116.18 |
| Polyol 1 | PRO1000 | 148.21 |
| Ionic component | DMPA | 13.19 |
| Chain terminating agent | MPEG1000 | 97.43 |
| Neutralizing agent | TEA | 7.96 |
| Chain extending agent | HMDA | 16.68 |
| D.I. water | water | 541.13 |

TEA was added to water, and 300 grams of prepolymer were dispersed in water/TEA.

Example 60

| component | abbreviation | grams |
|---|---|---|
| diisocyante | Des W | 122.64 |
| Polyol 1 | PPO1000 | 162.06 |
| Ionic component | DMPA | 13.17 |
| Chain terminating agent | MPEG750 | 77.13 |
| Neutralizing agent | TEA | 7.95 |
| Chain extending agent | HMDA | 17.59 |
| D.I. water | water | 542.00 |

TEA was added to water, and 300 grams of prepolymer were dispersed in water/TEA.

Example 61

| component | abbreviation | grams |
|---|---|---|
| diisocyante | Des W | 69.88 |
| Polyol | PPO1000 | 104.65 |
| Ionic component | DMPA | 7.66 |
| Chain terminating agent | MPEG750 | 42.81 |
| Neutralizing agent | TEA | 4.11 |
| Chain extending agent | HMDA | 9.41 |
| D.I. water | water | 376.73 |

TEA was added to water, and 200 grams of prepolymer were dispersed in water/TEA.

Example 62

| component | abbreviation | grams |
|---|---|---|
| diisocyante | Des W | 140.34 |
| Polyol | PPO1000 | 206.33 |
| Ionic component | DMPA | 18.45 |
| Chain terminating agent | DBA | 9.88 |
| Neutralizing agent | TEA | 10.46 |

-continued

| component | abbreviation | grams |
|---|---|---|
| Chain extending agent | HMDA | 17.52 |
| D.I. water | water | 535.78 |

TEA was added to prepolymer, and the reaction was stirred for 15 minutes at 70-75° C. Then DBA was added, and the reaction was stirred for another 15 minutes at 70-75° C. 305 grams of neutralized prepolymer were then dispersed in water.

Example 63

| component | abbreviation | grams |
|---|---|---|
| diisocyante | Des W | 136.88 |
| Polyol | PPO1000 | 201.25 |
| Ionic component | DMPA | 15.00 |
| Chain terminating agent 1 | MPEG550 | 9.88 |
| Chain terminating agent 2 | GA | 1.98 |
| Chain terminating agent 3 | DBA | 9.63 |
| Neutralizing agent | TEA | 10.46 |
| Chain extending agent | HMDA | 17.11 |
| D.I. water | water | 535.39 |

TEA was added to prepolymer, and the reaction was stirred for 15 minutes at 70-75° C. Then DBA was added, and the reaction was stirred for another 15 minutes at 70-75° C. 305 grams of neutralized prepolymer was then dispersed in water.

Example 64

| component | abbreviation | grams |
|---|---|---|
| diisocyante | Des W | 133.93 |
| Polyol | PRO1000 | 153.17 |
| Ionic component | DMPA | 17.57 |
| Chain terminating agent 1 | MPEG550 | 61.96 |
| Neutralizing agent | TEA | 8.62 |
| Chain extending agent | HMDA | 21.29 |
| D.I. water | water | 577.14 |

TEA was added to prepolymer, and 299 grams of neutralized prepolymer were dispersed in water.

TABLE II

Volume resistitivity (VR) data.

| Example # | VR (ohm/cm) |
|---|---|
| 32 | 2.10E+09 |
| 33 | 5.3E+10 |
| 37 | 2.2E+10 |
| 42 | 3.75E+10 |
| 43 | 1.60E+10 |
| 44 | 1.70E+09 |

TABLE III

Prepolymer and dispersion data table.

| Ex. # | wt % of total amt. of chain terminating agent in prepolymer | wt % of MPEG chain terminating agent in prepolymer | prepolymer viscosity @ 80° C. (cps) | Mw | pH | % solid | dispersion viscosity (cps) | Tc | dispersion appearance |
|---|---|---|---|---|---|---|---|---|---|
| 1 | 15.78 | 15.78 | 1948 | 27,422 | 7.59 | 35.8 | 73 | 61.4 | transluscent clear w/blue tinge |
| 2 | 15.78 | 15.78 | 1948 | 29,655 | 7.93 | 36.3 | 75 | 71.0 | transluscent clear w/blue tinge |
| 3 | 15.78 | 15.78 | 2416 | 35,894 | 7.38 | 36.61 | 42 | 62.4 | transluscent clear w/blue tinge |
| 4 | 15.78 | 15.78 | 2086 | 29,747 | 7.29 | 37.4 | 49 | 59.8 | transluscent clear w/blue tinge |
| 5 | 15.78 | 15.78 | 2180 | 26,865 | 6.96 | 38.1 | 28 | 57.4 | transluscent clear w/blue tinge |
| 6 | 15.78 | 15.78 | 4825 | 40,219 | 7.18 | 37.0 | 31 | 84.2 | transluscent clear w/blue tinge |
| 7 | 15.78 | 15.78 | 1850 | 26,379 | 7.41 | 36.4 | 88 | 74.9 | transluscent clear w/blue tinge |
| 8 | 15.78 | 15.78 | 1990 | 26,819 | 7.66 | 37.0 | 113 | 57.0 | transluscent clear w/blue tinge |
| 9 | 14.40 | 14.40 | 2106 | 23,330 | 7.41 | 38.2 | 51 | 59.6 | transluscent clear w/blue tinge |
| 10 | 13.80 | 13.80 | 2786 | 28,879 | 7.52 | 37.6 | 60 | 57.0 | transluscent clear w/blue tinge |
| 11 | 15.78 | 15.78 | 2008 | 24,193 | 7.60 | 36.6 | 73 | 102.0 | transluscent clear w/blue tinge |
| 14 | 16.81 | 16.81 | 1367 | 20,687 | 7.49 | 37.0 | 34 | 61.7 | transluscent clear w/blue tinge |
| 12 | 15.78 | 15.78 | 2033 | 115,506 | 7.48 | 37.3 | 76 | 100.3 | transluscent clear w/blue tinge |
| 13 | 15.78 | 15.78 | 1937 | 46,366 | 7.41 | 38.5 | 59 | 67.1 | transluscent clear w/blue tinge |
| 15 | 15.78 | 15.78 | 3054 | 32,039 | 7.33 | 37.5 | 38 | 65.4 | transluscent clear w/blue tinge |
| 16 | 16.66 | 16.66 | 5444 | 27,958 | 7.65 | 35.7 | 55 | 111.3 | transluscent clear w/blue tinge |
| 17 | 16.66 | 16.66 | 6350 | 26,026 | 7.18 | 36.4 | 50 | 127.4 | transluscent clear w/light brown tinge |
| 18 | 16.66 | 16.66 | 7042 | 28,326 | 7.52 | 35.5 | 40 | 97.8 | transluscent clear w/blue tinge |
| 19 | 16.66 | 16.66 | 7733 | 29,300 | 7.38 | 36.5 | 60 | 114.9 | transluscent clear w/blue tinge |
| 20 | 16.66 | 16.66 | 6525 | 65,819 | 7.47 | 35.7 | 35 | 125.1 | transluscent clear w/blue tinge |
| 21 | 15.78 | 15.78 | 2818 | 32,895 | 7.31 | 38.3 | 45 | 65.6 | transluscent clear w/blue tinge |
| 22 | 16.66 | 16.66 | 5119 | 34,698 | 7.53 | 35.5 | 39 | 72.2 | transluscent clear w/blue tinge |
| 23 | 16.66 | 16.66 | 5119 | 33,408 | 7.30 | 37.2 | 160 | Not observed | transluscent brown |
| 24 | 16.66 | 16.66 | 5550 | 34,243 | 7.49 | 35.5 | 41 | 131.7 | transluscent brown |
| 25 | 16.66 | 16.66 | 5550 | 40,486 | 7.37 | 36.6 | 38 | 76.1 | transluscent clear w/blue tinge |
| 26 | 16.66 | 16.66 | 5400 | 35,106 | 7.27 | 38.7 | 89 | 115.7 | transluscent clear w/blue tinge |
| 27 | 16.66 | 16.66 | 5400 | 37,973 | 7.85 | 35.0 | 46 | 101.5 | transluscent clear w/blue tinge |
| 28 | 16.66 | 16.66 | 5508 | 253,614 | 7.62 | 35.9 | 54 | 157.3 | transluscent clear w/blue tinge |
| 29 | 16.66 | 16.66 | 5713 | 30,705 | 7.63 | 35.3 | 40 | 81.4 | transluscent clear w/blue tinge |
| 30 | 16.66 | 16.66 | 5508 | 216,389 | 8.14 | 37.3 | 55 | 141.6 | transluscent clear w/blue tinge |
| 31 | 15.78 | 15.78 | 6792 | 38,395 | 7.30 | 35.7 | 32 | 116.5 | transluscent clear w/blue tinge |
| 32 | 16.66 | 16.66 | 6350 | 25,713 | 7.26 | 36.7 | 44 | 71.9 | transluscent clear w/yellow tinge |
| 33 | 8.95 | 7.86 | 5180 | 32,985 | 7.08 | 36.1 | 30 | 85.9 | transluscent white |
| 34 | 11.14 | 11.14 | 2025 | 28,496 | 7.30 | 36.1 | 77 | Not measured | transluscent white |

TABLE III-continued

Prepolymer and dispersion data table.

| Ex. # | wt % of total amt. of chain terminating agent in prepolymer | wt % of MPEG chain terminating agent in prepolymer | prepolymer viscosity @ 80° C. (cps) | Mw | pH | % solid | dispersion viscosity (cps) | Tc | dispersion appearance |
|---|---|---|---|---|---|---|---|---|---|
| 35 | 11.14 | 11.14 | 2115 | 27,023 | 7.62 | 41.1 | 112 | 86.4 | transluscent white, slowly settle over time |
| 36 | 6.43 | 5.04 | 5400 | 32,405 | 8.75 | 35.6 | 155 | 43.4 | transluscent white with blue tinge |
| 37 | 7.94 | 5.78 | 5508 | 36,181 | 7.58 | 36.2 | 73 | 75.8 | transluscent white with blue tinge |
| 38 | 11.03 | 10.32 | 6106 | 31,195 | 7.08 | 36.7 | 54 | 39.5 | transluscent clear with blue tinge |
| 39 | 11.03 | 10.32 | 6933 | 35,694 | 6.76 | 36.7 | 59 | 45.2 | transluscent clear with blue tinge |
| 40 | 8.59 | 8.08 | 2950 | 38,607 | 7.70 | 37.0 | 65 | 95.8 | transluscent clear with blue tinge |
| 41 | 6.10 | 4.80 | 2721 | 44,900 | 9.24 | 35.9 | 47 | 95.2 | transluscent clear with blue tinge |
| 42 | 6.71 | 5.26 | 5883 | 44,197 | 7.03 | 36.6 | 31 | 108.0 | transluscent clear with blue tinge |
| 43 | 17.06 | 17.06 | 3775 | 29,399 | 7.33 | 38.4 | 111 | 54.3 | transluscent clear with blue tinge |
| 44 | 15.78 | 15.78 | 1948 | 27,422 | 7.59 | 35.8 | 73 | 61.4 | transluscent clear with blue tinge |
| 45 | 6.55 | 5.13 | 6608 | 28,476 | 8.11 | 36.59 | 160 | Not measured | transluscent clear with blue tinge |
| 46 | 5.29 | 4.14 | 5000 | 37,289 | 8.16 | 36.41 | 460 | Not measured | transluscent clear with blue tinge |
| 47 | 6.34 | 4.97 | 4919 | 36,849 | 8.14 | 36.11 | 100 | Not measured | transluscent clear with blue tinge |
| 48 | 6.65 | 5.21 | 6867 | 36,977 | 8.72 | 35.15 | 162 | Not measured | transluscent clear with blue tinge |
| 49 | 16.66 | 16.66 | 4744 | 35,957 | 7.57 | 36.06 | 72 | 95.9 | transluscent clear with blue tinge |
| 50 | 5.87 | 4.82 | 5600 | 33,469 | 7.40 | 36.37 | 127 | 76.6 | transluscent clear with blue tinge |
| 51 | 6.85 | 0 | 6033 | 23,812 | 7.67 | 32.8 | 6 | 65.9 | two layers |
| 52 | 5.31 | 0 | 5100 | 27,073 | 7.39 | 31.2 | 11 | 91.8 | two layers |
| 53 | 10.10 | 6.06 | 3475 | 25,033 | 7.59 | 38.0 | 31 | 61.3 | milky white, settle over time |
| 54 | 8.35 | 5.01 | 5200 | 28,962 | 7.72 | 37.9 | 72 | 83.4 | milky white, settle over time |
| 55 | 12.93 | 8.16 | 2825 | 28,933 | 7.50 | 37.0 | 73 | 65.1 | two layers |
| 56 | 8.60 | 8.60 | 8500 | 72,557 | 7.54 | 36.7 | 330 | 99.2 | opaque milky white, large amt. particulate |
| 57 | 8.71 | 8.71 | 10475 | 62,120 | 7.70 | 35.3 | 94 | 137.5 | opaque milky white, large amt. particulate |
| 58 | 12.90 | 12.90 | 24500 | 40,025 | 7.42 | 33.2 | 13 | 101.7 | opaque milky white, large amt. particulate |
| 59 | 25.98 | 25.98 | 1635 | 35,525 | 7.82 | 36.8 | 291 | 78.4 | clear with light yellow tinge |
| 60 | 20.57 | 20.57 | 1400 | 24,722 | 7.45 | 36.7 | 90 | 69.2 | clear with light yellow tinge |
| 61 | 19.03 | 19.03 | 2180 | 30,298 | 7.58 | 36.2 | 33 | 53.1 | clear with light yellow tinge |
| 62 | 0 | 0 | 13400 | 78,246 | 7.81 | 36.0 | 398 | Not measured | cloudy white |
| 63 | 5.83 | 2.73 | 8950 | 40,149 | 7.71 | 36.7 | 149 | 92.3 | transluscent white w/light yellow tinge |
| 64 | 4.88 | 3.4 | 3421 | 29,742 | 7.08 | 34.4 | 39 | 83.8 | transluscent clear |

The presently preferred compositions of the invention provided stable and/or homogeneous dispersion for the dispersion appearance. Some of the examples that did not provide such dispersion appearance are presently not preferred but may with some slight process modifications achieve a stable and homogeneous dispersion appearance. Alternatively, those dispersions may be useful in some applications as is.

TABLE IV

Comparison of crossover temperature Tc.

| Example # | Acid number | Mw | Crossover temperature Tc (° C.) |
|---|---|---|---|
| 2 | 14.6 | 28,655 | 71.0 |
| 64 | 20.1 | 29,742 | 83.8 |

Crosslinking Study

Figure 3:
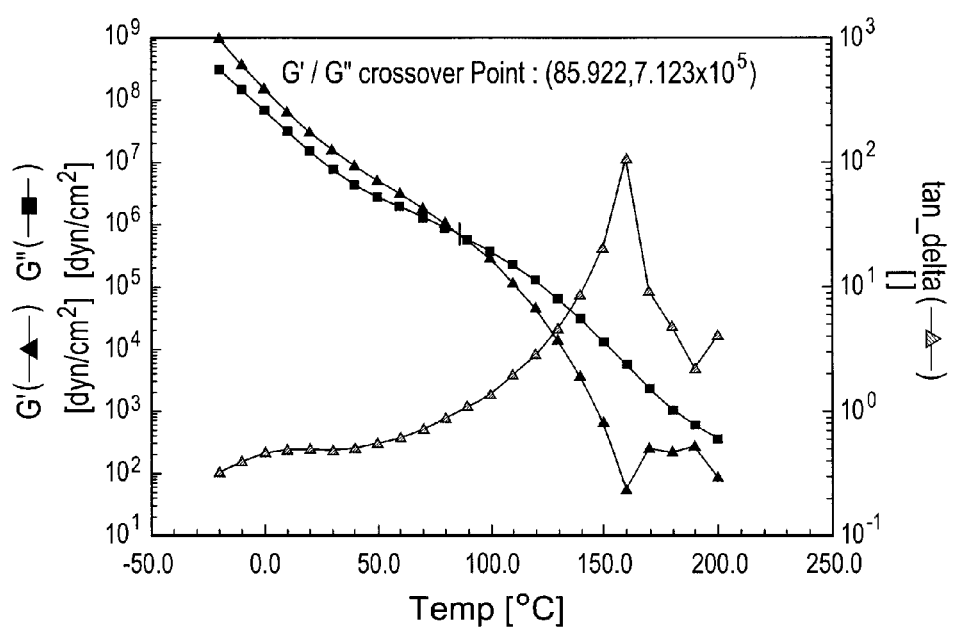
FIG. 3 provides the dynamic mechanical analysis of the polyurethane dispersion of Example 33.
Figure 4:
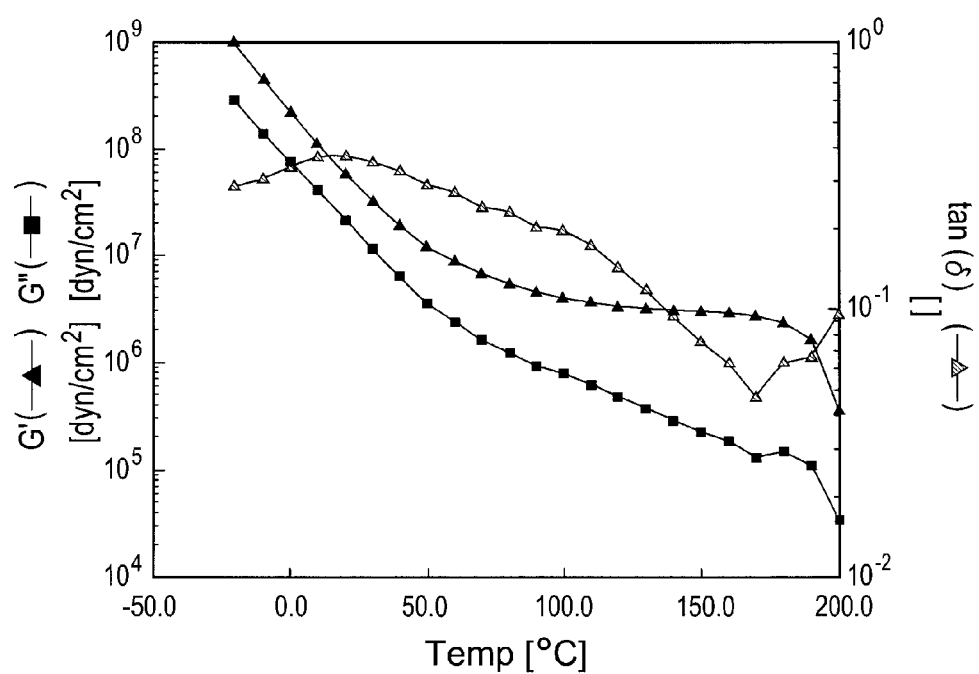
FIG. 4 provides the dynamic mechanical analysis of the polyurethane dispersion of Example 33 with 5% of Polyaziridine PZ-28.

Polyurethane dispersions were formulated with desired amount of crosslinker as listed in Table V. The formulations were stirred at room temperature for an hour and coated on polyethylene substrates and then cured at 70° C. for 72 hours. Then films were subject to dynamic mechanical analysis (DMA) to determine crossover temperature. Polyaziridine PZ-28 was obtained from Polyaziridine LLC, CarbodiimideV-04 and V-02-L2 from Nisshinbo, and Vikoflex 7190 by Arkema Inc. FIG. 3 shows the DMA of Example 33, and FIG. 4 shows the DMA of Example 33 with 5% of Polyaziridine PZ-28.

TABLE V

Crosslinking study.

| Example # | crosslinker type | crosslinker amt. (wt % on polyurethane polymer solids) | Crossover Temperature Tc (° C.) | Temperature (° C.) at 1 × 10E6 (dyn/cm$^2$) storage modulus |
|---|---|---|---|---|
| 33 | None | 0 | 85.9 | 85.9 |
| 33 | Polyaziridine PZ-28 | 5 | None | 190 |
| 33 | Carbodiimide V-04 | 6.5 | 133.3 | 95 |
| 33 | Carbodiimide V-02-L2 | 4.5 | None | 150 |
| 49 | None | 0 | 95.9 | 95.9 |
| 49 | Vikoflex 7190 | 5 | None | 125 |
| 49 | Carbodiimide V-04 | 10 | 125.7 | 105 |

Stability Study of Low and High Temperature Storage:

About 25 grams of polyurethane dispersions were stored in a refrigerator for 5 days at a temperature of 4-7° C. After 5 days, the dispersions were placed at room temperature for 2 days to equilibrate before measurement of the viscosity at 25° C. Initial dispersion viscosity before the dispersion was cold stored was measured and listed in Table VI for comparison.

TABLE VI

Dispersion viscosity befor and after cold storage.

| example # | dispersion viscosity (centipoise) before cold storage | dispersion viscosity (centipoise) after cold storage |
|---|---|---|
| 3 | 71 | 80 |
| 5 | 50 | 59 |
| 6 | 40 | 43 |
| 33 | 35 | 38 |
| 36 | 72 | 82 |
| 49 | 77 | 75 |
| Comparative Example* | 653 | 1,117 |

*The Comparative Example was a solvent-containing dispersion synthesized exactly as described in Example 2 of U.S. Pat. No. 7,342,068 with a weight average molecular weight of between 45,000 and 55,000.

A dynamic temperature study was also performed on sample of Example 36. The sample was cooled and heated from the range of 5° C.-50° C. in the viscometer using a controlled temperature bath. After reaching the temperature for 20 minutes, the viscosity of the dispersion was measured. In first step, the viscosity was measured at 25° C., second step, the dispersion was cooled down to 5° C., and third step, the dispersion was heated up to 50° C. The next day, the process was repeated. The results show no irreversible viscosity effects to temperature changes.

| Temperature (° C.) | Viscosity (centipoise) |
|---|---|
| 25 (day one) | 72 |
| 5 (day one) | 459 |
| 50 (day one) | 38 |
| 25 (day two) | 74 |
| 5 (day two) | 443 |
| 50 (day two) | 46 |

Crystallinity Analysis

Figure 2:
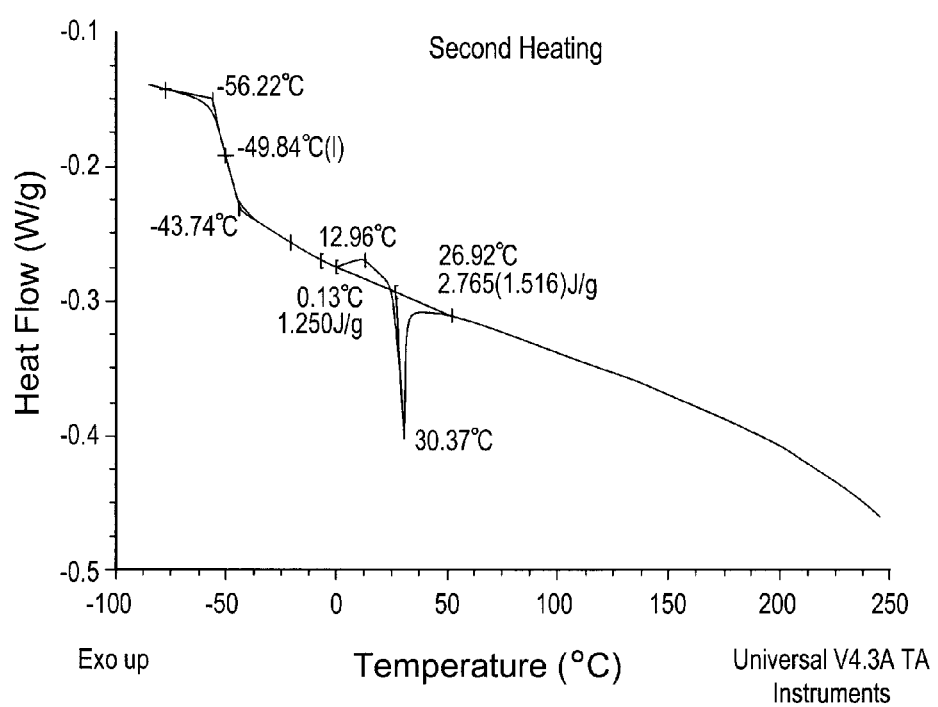
FIG. 2 provides the differential scanning calorimetry (DSC) of the polyurethane dispersion of Example 61.

Exemplary polyurethane dispersions were coated onto a substrate, and allowed to dry into a film. The $T_g$ and crystallinity of the film was determined via differential scanning calorimetry (DSC) using a heating rate of 20° C./min and a helium purge gas having a flow rate of 25 cubic centimeter (ccm) using a crimped aluminum pan. FIG. 1 shows the DSC of polyurethane dispersion from Example 12. There was no evidence of exothermic crystallization of endothermic melt. FIG. 2 shows the DSC of polyurethane dispersion from Example 61. There was clear evidence of exothermic crystallization of endothermic melt.

The invention claimed is:

1. A solvent-free aqueous polyurethane dispersion comprising non-crystalline polyurethane polymer comprising the reaction product of:
   (A) an organic solvent-free isocyanate-terminated prepolymer having a bulk viscosity between 500 centipoise to 15,000 centipoise at 80° C. and comprising the reaction product of:
      (i) at least one polyisocyanate selected from the group consisting of aliphatic and cycloaliphatic polyisocyanates and mixtures thereof;
      (ii) at least one polyol, wherein said at least one polyol is selected from the group consisting of polyether polyols, polycarbonate polyols and mixtures thereof;
      (iii) at least one isocyanate-reactive compound comprising one or more ionic groups or potential ionic groups per molecule; and
      (iv) at least one isocyanate chain terminating agent comprising at least one carboxylic acid or sulfonic acid group per molecule and one isocyanate-reactive group per molecule, and at least one isocyanate chain terminating agent comprising hydrophilic ethylene oxide units and one isocyanate-reactive group per molecule and having a number average molecular weight of 250 to 600 g/mol, wherein said chain terminating agent comprising hydrophilic ethylene oxide units is from 3 to 27% by weight of said prepolymer;
   (B) at least one neutralizing agent that reacts with the potential ionic groups of the at least one isocyanate-reactive compound to form ionic groups;
   and
   (C) at least one chain extending agent comprising an organic polyamine;
   and wherein the dispersion further comprises solvent-free water.

2. The solvent-free aqueous polyurethane dispersion of claim 1 wherein said at least one polyisocyanate comprises at least one diisocyanate selected from the group consisting of: 1 isocyanato-3-isocyanatomethy-3,5,5-trimethyl-cyclohexane (isophorone diisocyanate (IPDI)); tetramethylene diisocyanate; hexamethylene diisocyanate (HDI); trans-cyclohexan-1,4-diisocyante (TMI), 1-methyl-2,4-diisocyanatocyclohexane; 1,6-diisocyanato-2,4,4-trimethyl hexane; 1,3-bis(isocyanatomethyl)-cyclohexane; 1,4-bis(isocyanatomethyl)-cyclohexane; chlorinated and brominated diisocyanates; phosphorus-containing diisocyanates; tetramethoxy butane-1,4-diisocyanate; butane-1,4-diisocyanate, hexane-1,6-diisocyanate; dicyclohexyl methane diisocyanate; cyclohexane-1,4-diisocyanate; cyclohexane-1,2-diisocyanate; cyclohexane-1,3-diisocyanate; 1,2-diisocyanatododecane; ethylene diisocyanate; phthalic acid-bis-isocyanatoethyl ester; polyisocyanates containing reactive halogen atoms; norbornane diisocyanate; polyisocyanates containing reactive halogen atoms; sulfur-containing polyisocyanates; dimer fatty acid diisocyanate; and partly masked polyisocyanates and mixtures thereof.

3. The solvent-free aqueous polyurethane dispersion of claim 1 wherein said at least one polyisocyanate comprises at least 50% by weight dicyclohexylmethane 4,4-diisocyanate based on a total weight of at least one polyisocyanate.

4. The solvent-free aqueous polyurethane dispersion of claim 1 wherein said at least one polyol has a number average molecular weight that ranges from about 600 to about 3,500 g/mol.

5. The solvent-free aqueous polyurethane dispersion of claim 1 wherein said at least one polyol comprises at least one difunctional polyol.

6. The solvent-free aqueous polyurethane dispersion of claim 1 wherein said at least one isocyanate chain terminating agent comprising at least one carboxylic acid or sulfonic acid group per molecule comprises 0.1 to 8 weight percent of amino-, hydroxyl-, or mercapto-carboxylic acid or sulfonic acid of the total weight of said at least one polyisocyanate, said at least one polyol, said at least one isocyanate-reactive compound and said isocyanate chain terminating agents.

7. The solvent-free aqueous polyurethane dispersion of claim 1 wherein the isocyanate-reactive group in said isocyanate chain terminating agents constitutes at least 5 percent by molar ratio to the total isocyanate-reactive groups in said isocyanate-terminated prepolymer.

8. The solvent-free aqueous polyurethane dispersion of claim 1 wherein said at least one isocyanate chain terminating agent comprising hydrophilic ethylene oxide units comprises 0.5 to 25 weight percent of the total weight of said at least one polyisocyanate, said at least one polyol, said at least one isocyanate-reactive compound and said isocyanate chain terminating agents.

9. The solvent-free aqueous polyurethane dispersion of claim 1 further wherein said neutralizing agent comprises a tertiary amine.

10. The solvent-free aqueous polyurethane dispersion of claim 1 further wherein said at least one chain extending agent comprises an organic polyamine.

11. The solvent-free aqueous polyurethane dispersion of claim 1 wherein said at least one isocyanate-reactive compound comprises one or more than one ionic groups or potential ionic groups per molecule, each of said potential ionic groups being capable of forming a salt upon neutralization, and at least two isocyanate-reactive groups per molecule selected from a hydroxyl group, a thio group, a primary amino group, a secondary amino group, and combinations thereof.

12. The solvent-free aqueous polyurethane dispersion of claim 1 wherein said at least one polyol comprises poly (propylene glycol) or poly(tetramethylene ether) glycol or mixtures thereof.

13. The solvent-free aqueous polyurethane dispersion of claim 1 wherein the at least one isocyanate chain terminating agent comprising hydrophilic ethylene oxide units and one isocyanate-reactive group per molecule is poly(ethylene glycol) monoalkyl ether.

14. The solvent-free aqueous polyurethane dispersion of claim 1 wherein said at least one polyol comprises at least about 40 percent by weight of poly(propylene glycol) or poly(tetramethylene ether) glycol having a number average molecular weight of 1,000 to 2,000 g/mol based on a total weight of at least one polyol.

15. The solvent-free aqueous polyurethane dispersion of claim 1 wherein said at least one isocyanate-reactive compound comprise hydroxyl- or amino-carboxylic acids or hydroxyl- or amino-sulfonic acids.

16. The solvent-free aqueous polyurethane dispersion of claim 1 wherein said at least one isocyanate-reactive compound is an acid selected from the group consisting of dimethylolpropionic acid (DMPA), dimethylol butanioc acid (DMBA), and mixtures thereof.

17. The solvent-free aqueous polyurethane dispersion of claim 16 wherein said neutralizing agent neutralizes from 45 to 100 molar percent of acid groups in the at least one isocyanate-reactive compound.

18. The solvent-free aqueous polyurethane dispersion of claim 1 wherein said at least one chain extending agent comprises organic polyamines having at least two or more primary, or secondary amino groups or mixtures of primary and secondary amino groups per molecule.

19. The solvent-free aqueous polyurethane dispersion of claim 1 wherein the at least one chain extending agent comprises an organic polyamine selected from the group consisting of 1,2-ethylenediamine, 3,3-dimethyl-1,3-propylenediamine (neopentyl diamine), 1,5-diamino-1-methyl-pentane,1,6-hexamethylenediamine (HMDA), isophorone diamine (IPDA), 1,4-bis(aminomethyl)cyclohexane (1,4-BAC), 1,3-bis(aminomethyl)cyclohexane (1,3-BAC), bis(p-aminocyclohexylmethane) (PACM), 1,2-diaminocyclohexane (1,2-DACH), and 1,4-diaminocyclohexane (1,4-DACH).

20. The solvent-free aqueous polyurethane dispersion of claim 1 wherein the at least one chain extending agent comprises an organic polyamine having at least three or more primary or secondary amino groups or mixtures of primary and secondary amino groups per molecule.

21. The solvent-free aqueous polyurethane dispersion of claim 1 wherein the at least one chain extending agent comprises an organic polyamine selected from the group consisting of diethylene triamine, triethylene tetramine, tetraethylene pentamine and pentaethylene hexamine.

22. The solvent-free aqueous polyurethane dispersion of claim 1 wherein the neutralizing agent comprises a tertiary amine selected from the group consisting of trimethyl amine, triethyl amine, triisopropyl amine, tributyl amine, N,N-dimethyl-cyclohexyl amine, N,N-dimethyl-ethanol amine, N,N-diethyl-ethanol amine, triethanol amine, N-methyldiethanol amine, dimethylaminopropanol, and 2-methoxyethyldimethyl amine.

23. The solvent-free aqueous polyurethane dispersion of claim 1 wherein the prepolymer comprises a molar ratio of the at least one polyisocyanate to the sum of the moles of the at least one polyol, the at least one isocyanate-reactive compound, and the isocyanate chain terminating agents ranges from 1.1:1 to 1.8:1.

24. The solvent-free aqueous polyurethane dispersion of claim 1 wherein said polyurethane dispersion comprises molecules of polyurethane, said molecules having a particle size of less than about 2 microns.

25. The solvent-free aqueous polyurethane dispersion of claim 1 further wherein the prepolymer comprises from 20 to 60 percent by weight of the at least one polyisocyanate, from 20 to 80 percent by weight of the at least one polyol, from 1 to 10 percent by weight of the at least one isocyanate-reactive compound, and from 5 to 20 percent by weight of the isocyanate chain terminating agents.

26. The solvent-free aqueous polyurethane dispersion of claim 1 wherein said at least one polyisocyanate comprises at least 50 percent by weight of dicyclohexylmethane 4,4-diisocyanate based on a total weight of at least one polyisocyanate;
   said at least one polyol comprises poly(propylene glycol) or poly(tetramethylene ether) glycol or mixtures thereof;
   said at least one isocyanate-reactive compound further comprises at least two isocyanate-reactive groups selected from a hydroxyl, a thio, a primary amino, a secondary amino, and combinations thereof;
   said isocyanate chain terminating agents comprise monofunctional compounds containing active hydrogen groups selected from a hydroxyl, a thio, and an amino group;
   said neutralizing agent comprises an amine group that reacts with said isocyanate-reactive compound; and
   said at least one chain extending agent comprises an organic polyamine.

27. The solvent-free aqueous polyurethane dispersion of claim 1 wherein the particle size of the polyurethane polymer molecules in the aqueous dispersion is less than about 2 microns.

28. The solvent-free aqueous polyurethane dispersion of claim 1 wherein the base volume resistivity is adjusted by adding at least one ionic additive selected from an inorganic salt, an organic salt, or mixtures thereof.

29. The solvent-free aqueous polyurethane dispersion of claim 28 wherein the at least one ionic additive is selected from the group consisting of $LiCF_3SOF_3$, $LiClO_4$, $LiPF_6$, $LiBF_4$, $LiAsF_6$, $LiN(CF_3SO_2)_3$, an organic salt of t-butylammonium hexafluorophosphate, 1-butyl-2-methyl imidazolium hexafluorophate, 1-n-butyl-3-methylimidazolium dicyanoamide, and 1-ethyl-3-methylimidazolium thiocyanate, or mixtures thereof.

30. The solvent-free aqueous polyurethane dispersions of claim 1 wherein said solvent-free aqueous polyurethane dispersion further comprises at least one water soluble or dispersible polyfunctional crosslinking agent selected from the group consisting of isocyanates, aziridines, epoxies, carbodiimides and mixtures thereof.

31. An adhesive comprising the solvent-free aqueous polyurethane dispersion of claim 1.

32. The adhesive of claim 31 wherein said solvent-free aqueous polyurethane dispersion has been dried to remove said water.

33. A process for forming a solvent-free aqueous polyurethane dispersion comprising non-crystalline polyurethane polymer, the process comprising the steps of:
   (a) reacting in an organic solvent-free environment to form a polyurethane prepolymer having a bulk viscosity between 500 centipoise to 15,000 centipoise at 80° C.:
      (i) at least one polyisocyanate selected from the group consisting of aliphatic and cycloaliphatic polyisocyanates and mixtures thereof;
      (ii) at least one polyol wherein said at least one polyol is selected from the group consisting of polyether polyols, polycarbonate polyols, and mixtures thereof;
      (iii) at least one isocyanate-reactive compound comprising one or more ionic groups or potential ionic groups per molecule; and
      (iv) at least one isocyanate chain terminating agent comprising at least one carboxylic acid or sulfonic acid group per molecule and an isocyanate-reactive group per molecule; and at least one isocyanate chain terminating agent comprising hydrophilic ethylene oxide units and an isocyanate-reactive group per molecule selected from a hydroxyl group, a thio group, and an amino group and having a number average molecular weight of 250 to 600 g/mol; wherein said chain terminating agent comprising hydrophilic ethylene oxide units is from 3 to 27% by weight of said prepolymer;
   (b) neutralizing the one or more ionic groups or potential ionic groups in said isocyanate-terminated prepolymer with a neutralizing agent;
   (c) dispersing the isocyanate-terminated prepolymer in organic solvent-free water; and
   (d) reacting the isocyanate-terminated prepolymer with at least one chain extending agent to form a solvent-free non-crystalline polyurethane polymer dispersion.

34. The process of claim 33 further comprising the step of forming a reaction mixture comprising said components (i), (ii), (iii) and (iv) prior to or during said reacting step (a).

35. The process of claim 34 further comprising the step of combining at least some of said neutralizing agent with said reaction mixture.

36. The process of claim 35 further comprising the step of combining at least some of said neutralizing agent with said solvent-free water prior to said dispersing step.

37. The process of claim 34 further comprising the step of combining at least some of said neutralizing agent with said solvent-free water.

38. The process of claim 33 wherein during said reacting step said isocyanate chain terminating agents comprise 5 to 20 percent by weight of the total weight of said at least one polyisocyanate, said at least one polyol, said at least one isocyanate-reactive compound and said isocyanate chain terminating agents.

39. The process of claim 33 further wherein during said neutralizing step said one or more potential ionic groups of said at least one isocyanate-reactive compound form a salt.

40. The process of claim 34 wherein during said forming step the reaction mixture comprises from about 0.75 weight percent to about 8 weight percent free isocyanate groups based on the total weight of the reaction mixture.

41. The process of claim 34 wherein during said forming step, the reaction mixture comprises the isocyanate chain terminating agents in an amount sufficient to react with from about 2 to 50 mole percent of unreacted isocyanate groups contained in said reaction mixture.

42. The solvent-free aqueous polyurethane dispersion made by the process of claim 33.

43. A process for forming a solvent-free aqueous polyurethane dispersion, the process comprising the steps of:
   (a) reacting in an organic solvent-free environment:
      (i) at least one polyisocyanate comprising at least 50 percent by weight of dicyclohexylmethane 4,4-diisocyanate based on a total weight of at least one polyisocyanate;
      (ii) at least one polyol comprising poly(propylene glycol) or poly(tetramethylene ether) glycol;
      (iii) at least one isocyanate-reactive compound comprising one or more ionic groups or potential ionic groups per molecule, said one or more potential ionic groups being capable of forming a salt upon neutralization, and at least two isocyanate-reactive groups per molecule selected from a hydroxyl group, a thio group, a primary amino group, a secondary amino group, and combinations thereof; and
      (iv) at least one isocyanate chain terminating agent comprising at least one carboxylic acid or sulfonic acid group per molecule and at least one isocyanate chain terminating agent comprising hydrophilic ethylene oxide units and one isocyanate-reactive group per molecule selected from a hydroxyl group, a thio group, and an amino group to form an isocyanate-terminated prepolymer having a number average molecular weight of 250 to 600 g/mol;

wherein said chain terminating agent comprising hydrophilic ethylene oxide units is from 3 to 27% by weight of said prepolymer and further wherein said prepolymer has a viscosity between 500 centipoise (cps) to 15,000 centipoise when measured at 80° C.;

(b) neutralizing the potential ionic groups of the isocyanate-reactive compound with a neutralizing agent comprising an amino group;

(c) dispersing the isocyanate-terminated prepolymer in organic solvent-free water; and (d) reacting the isocyanate-terminated prepolymer with at least one chain extending agent comprising an organic polyamine to form a solvent-free polyurethane polymer dispersion.

44. The solvent-free aqueous polyurethane dispersion of claim 1, wherein said at chain terminating agents comprise a mixture of poly(ethylene oxide) monoalkyl ether and glycolic acid.

45. The solvent-free aqueous polyurethane dispersion of claim 1, wherein said chain terminating agents comprise a mixture of poly(ethylene oxide) monoalkyl ether, glycolic acid and n-dibutylamine.

* * * * *